(12) United States Patent
Tyson et al.

(10) Patent No.: US 10,257,896 B2
(45) Date of Patent: *Apr. 9, 2019

(54) INDIVIDUALLY ADDRESSABLE DIMMER SYSTEMS AND METHODS

(71) Applicant: Kichler Lighting LLC, Cleveland, OH (US)

(72) Inventors: Thomas Joseph Tyson, Cleveland, OH (US); John J. Andrisin, III, Brunswick, OH (US)

(73) Assignee: Kichler Lighting LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,238

(22) Filed: Dec. 7, 2017

(65) Prior Publication Data

US 2018/0110103 A1    Apr. 19, 2018

Related U.S. Application Data

(63) Continuation of application No. 14/463,795, filed on Aug. 20, 2014, now Pat. No. 9,860,949.

(60) Provisional application No. 61/868,832, filed on Aug. 22, 2013.

(51) Int. Cl.
  *H05B 33/08*    (2006.01)
  *H05B 37/02*    (2006.01)

(52) U.S. Cl.
  CPC ..... *H05B 33/0845* (2013.01); *H05B 37/0272* (2013.01); *H05B 33/0815* (2013.01)

(58) Field of Classification Search
  CPC ............ H05B 33/08; H05B 33/0815; H05B 33/0845; H05B 33/0842; H05B 37/02; H05B 37/0272
  See application file for complete search history.

(56) References Cited

U.S. PATENT DOCUMENTS

| 5,424,618 | A   | 6/1995  | Bertenshaw |                        |
|-----------|-----|---------|------------|------------------------|
| 7,038,399 | B2* | 5/2006  | Lys        | H05B 33/0809 315/291   |
| 2010/0141153 | A1 | 6/2010 | Recker   |                        |
| 2011/0062888 | A1* | 3/2011 | Bondy    | H05B 33/0815 315/294   |
| 2011/0140621 | A1* | 6/2011 | Yi       | H05B 33/0854 315/224   |
| 2012/0242246 | A1* | 9/2012 | Naruo    | H05B 33/0818 315/283   |
| 2014/0371931 | A1 | 12/2014 | Lin     |                        |

* cited by examiner

*Primary Examiner* — Thai Pham
(74) *Attorney, Agent, or Firm* — Brooks Kushman P.C.

(57) ABSTRACT

Systems and methods for of dimming generally considered to be non-dimmable with conventional dimmers. An exemplary dimming module accepts a power source for a light source and a dimming signal. The dimming module modifies the power signal and generates a modified power signal capable of dimming LED light sources (and other light sources) that are generally considered to be non-dimmable with conventional dimmers. The dimming signal can be a wireless signal. Exemplary embodiments include a computer application executing on a computer or handheld computer that can be used to remotely dim, via the dimming module, one or more LED light sources (and other light sources) that are generally considered to be non-dimmable with conventional dimmers.

17 Claims, 22 Drawing Sheets

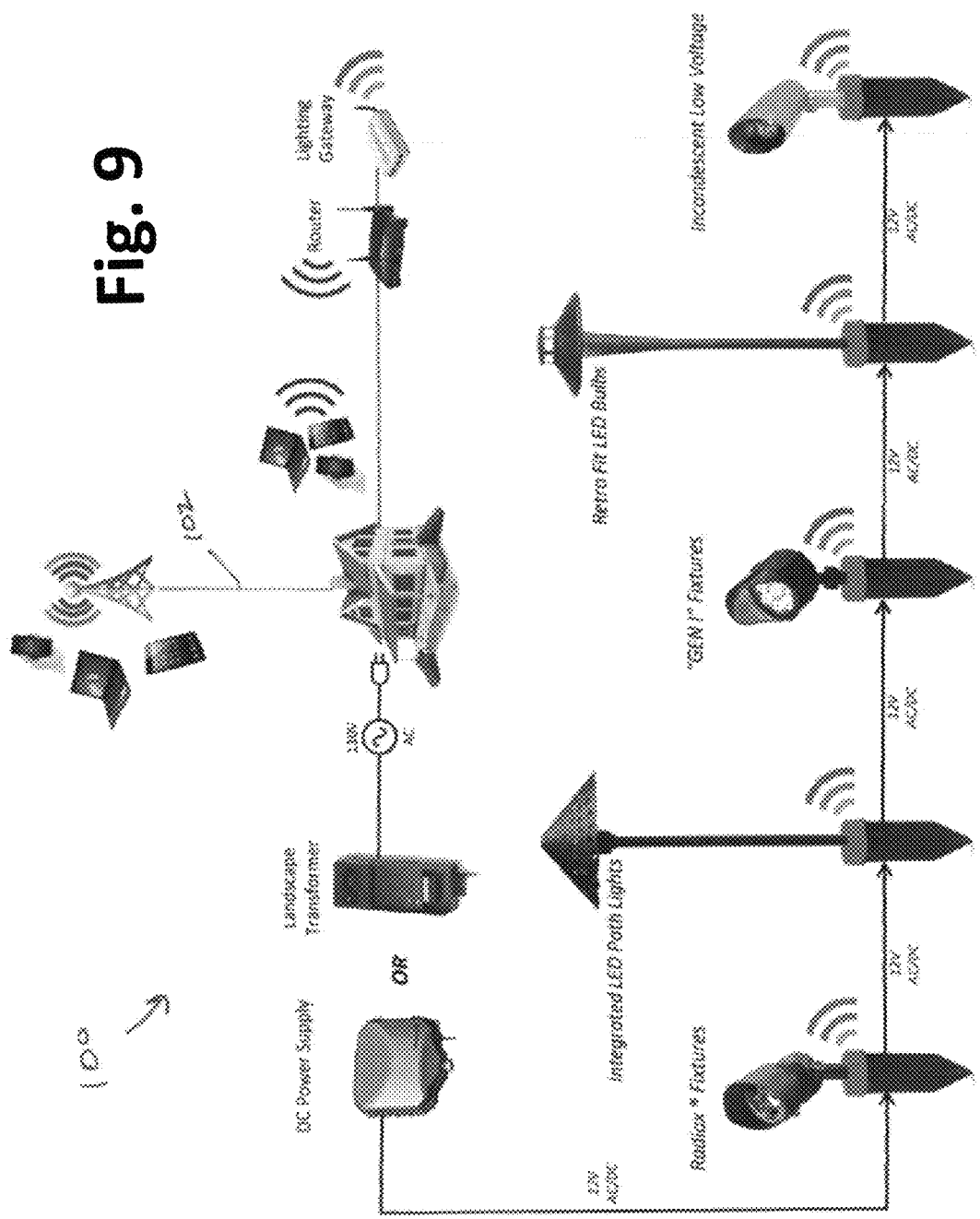

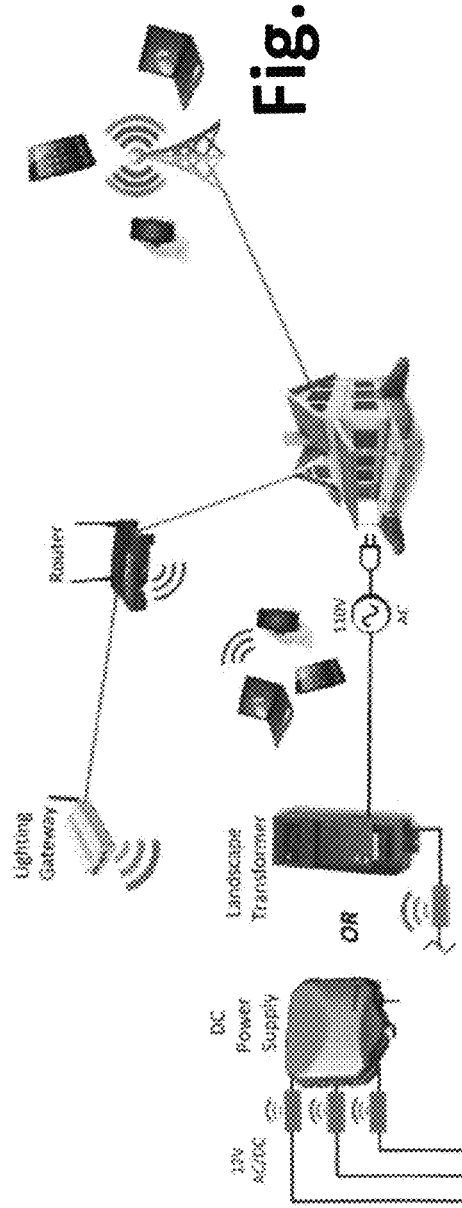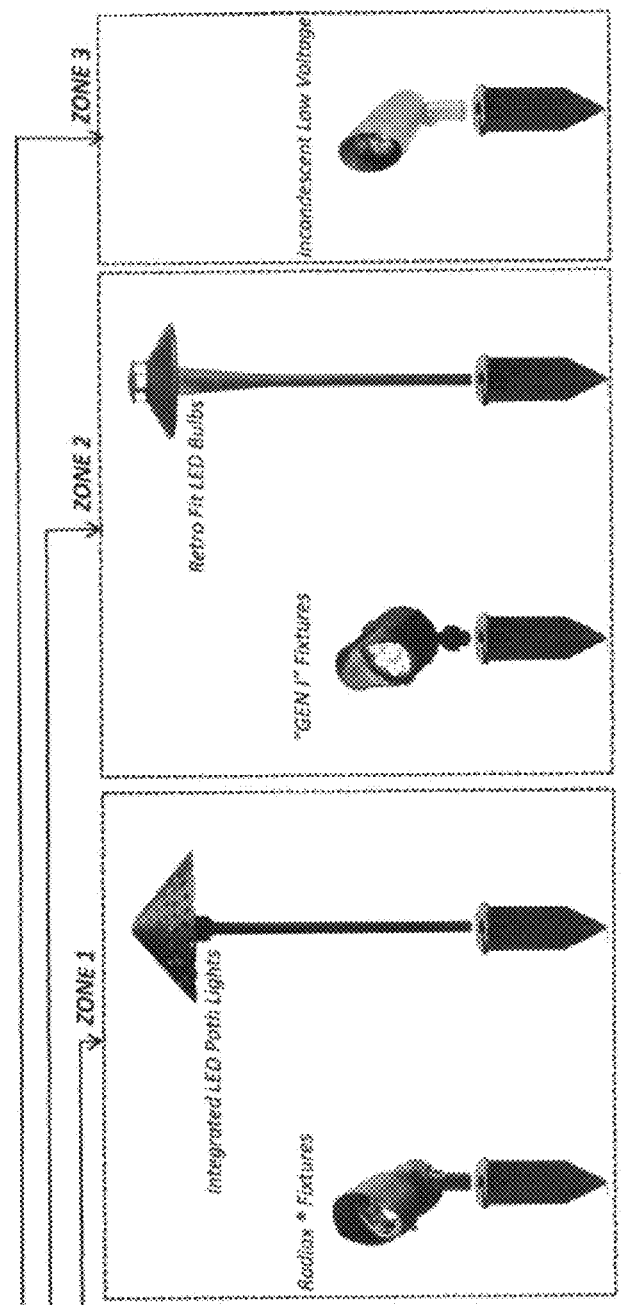
Fig. 10

$I_{OUT}$, AVE. OF WIRELESS DIMMING MODULE VERSUS DIM LEVEL SETTING

INDIVIDUALLY ADDRESSABLE DIMMER SYSTEMS AND METHODS

CROSS REFERENCE TO RELATED APPLICATIONS

This application is a continuation of U.S. patent application Ser. No. 14/463,795, filed Aug. 20, 2014 which claims priority to and the benefit of U.S. Provisional Patent Application Ser. No. 61/868,832, filed Aug. 22, 2013, and also entitled "INDIVIDUALLY ADDRESSABLE DIMMER SYSTEMS AND METHODS", the entire disclosures of both of which are incorporated herein by reference as though fully recited herein.

BACKGROUND

The present disclosure generally relates to the field of dimming light sources. The present disclosure relates more specifically to systems and methods of dimming light sources (causing them to appear to the human eye to be constantly ON, but at a lower intensity than full intensity) by modifying the power signal powering the light source.

Many conventional light emitting diode-based (LED) light sources are not dimmable with conventional dimmers (i.e., a conventional dimmer causes either no dimming effect—the LED stays at the same intensity and then at some point simply turns off—or causes the LED to flash in a manner visible to the human eye). Accordingly, LED light sources (and other light sources) are often specifically modified to enable them to accept a power signal from a conventional dimmer, such as a triac dimmer or rheostat dimmer, e.g., U.S. Pat. No. 7,038,399 (LED) and U.S. Pat. Nos. 5,821,699; 6,011,357; 6,448,713; and U.S. Pat. No. 5,982,111 (fluorescent). This approach requires that the light source driver be changed to accept the dimmed signal, light the light source, and dim the light source all in response to the dimmed signal.

SUMMARY

The present application takes a different approach, by moving away from a conventional dimmer, and presents a novel dimmer circuit. More specifically, the present application discloses systems and methods for remotely dimming LED light sources that are generally considered to be non-dimmable with conventional dimmers (i.e., a conventional dimmer causes either no effect—the LED stays at the same intensity and then at some point simply turns off—or causes the LED to flash in a manner visible to the human eye). The exemplary circuits herein also dim other light sources, as well (e.g., incandescent light sources), in addition to LED light sources. An exemplary dimming module accepts a power source for a light source and a dimming signal. The dimming module modifies the power signal and generates a modified power signal capable of dimming LED light sources (and other light sources) that are generally considered to be non-dimmable with conventional dimmers. The dimming signal can be a wireless signal. Exemplary embodiments include a computer application (an "app") executing on a computer or even a handheld computer, such as a smart phone, pad computer, or tablet computer, that can be used to remotely dim, via the dimming module, one or more LED light sources (and other light sources) that are generally considered to be non-dimmable with conventional dimmers.

BRIEF DESCRIPTION OF DRAWINGS

FIG. 9 is a high-level schematic block diagram of an exemplary dimmer module.

FIG. 10 is a high-level schematic block diagram of an exemplary dimmer module.

DETAILED DESCRIPTION

Figure 1:
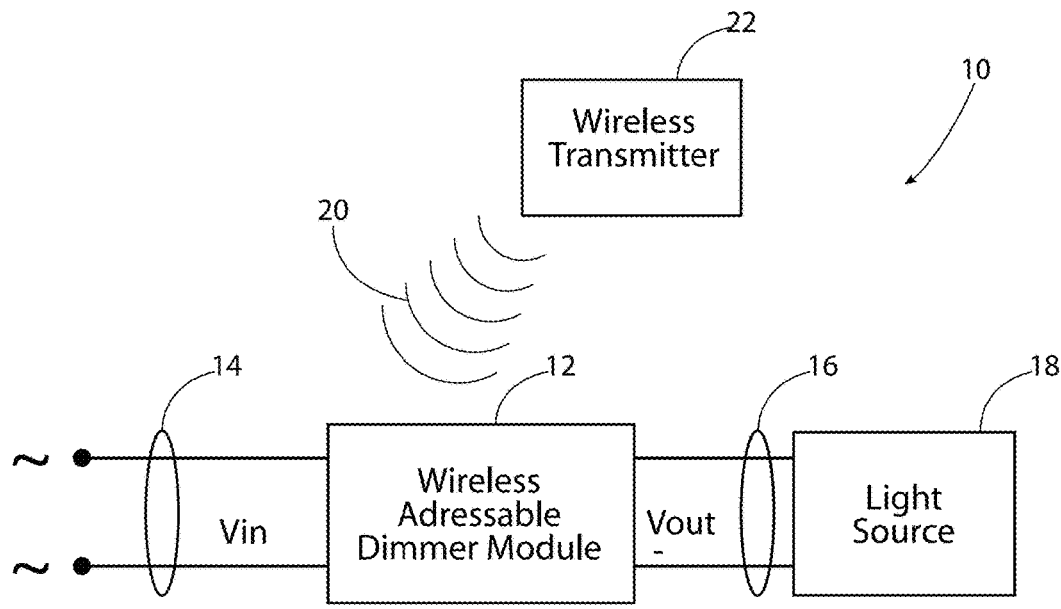
FIG. 1 is a high-level schematic block diagram of an exemplary dimming system.

Referring to FIG. 1, a block diagram of an exemplary system 10 is shown. System 10 includes a dimmer module 12 that receives a power signal 14 and a dimming signal. The dimming module 12 modifies the power signal 14 and generates a modified power signal 16 capable of dimming LED light sources (and other light sources) 18 that are generally considered to be non-dimmable with conventional dimmers. The power signal 14 can be an AC signal or a DC signal or a hybrid AC/DC signal (e.g., an AC signal with a DC offset). If the power signal 14 is an AC power signal (or a hybrid AC/DC signal), e.g., a 50-60 Hz AC signal, the dimmer module 12 generates a modified power signal 16 having a significant frequency component at least ten times the frequency of the AC power signal consistent with the dimming signal that is capable of dimming LED light sources (and other light sources) 18 that are generally considered to be non-dimmable with conventional dimmers. In exemplary embodiments, an exemplary dimmer module 12 interrupts one side of the AC power signal with a switch (e.g., a field effect transistor) at a frequency at least ten times the frequency of the AC power signal. The resulting modified power signal 16 has a significant frequency component at least ten times the frequency of the AC power signal consistent with the dimming signal that is capable of dimming LED light sources (and other light sources) 18 that are generally considered to be non-dimmable with conventional dimmers. Such a signal mimics the AC power signal in at least one respect, in the sense that the modified power signal 16 has an overall envelope that is the same frequency of the AC power signal 14.

Figure 2:
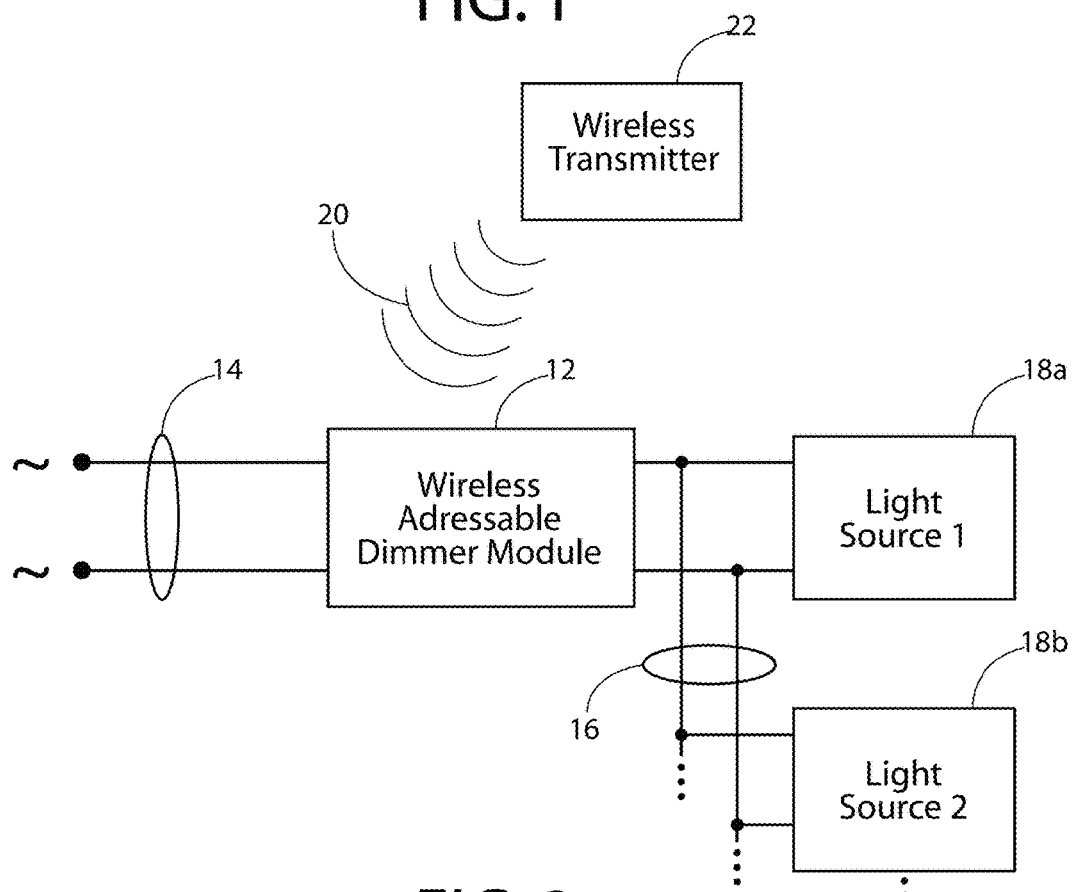
FIG. 2 is another high-level schematic block diagram of an exemplary dimming system.

As illustrated in FIG. 2, the dimming module 12 can be individually addressable to control (e.g., dim in response to a dimming signal) a single light source 18 or a plurality of light sources 18a, 18b, etc., that are generally considered to be non-dimmable with conventional dimmers grouped in a "zone."

The dimming signal can be a wireless dimming signal 20 from a wireless transmitter 22 (making the addressable dimmer module 12 a wireless addressable dimmer module 12), such as any one or more of a Bluetooth signal, a Z-wave signal, an 802.15.4 (i.e., "Zigbee"), an 802.11 signal (WiFi), an NFC signal, a GPRS signal, a CDPD signal, a GSM signal, a UMTS signal, a CDMA signal, an LTE signal, a WiMax signal, an infrared signal, an ultraviolet signal, an acoustic signal, or some other wireless signal. In the alternative, the dimming signal can come from a wired source, such as via the power signal 14 (e.g., X10 signals carried by the conductors for the power signal 14).

Figure 3:
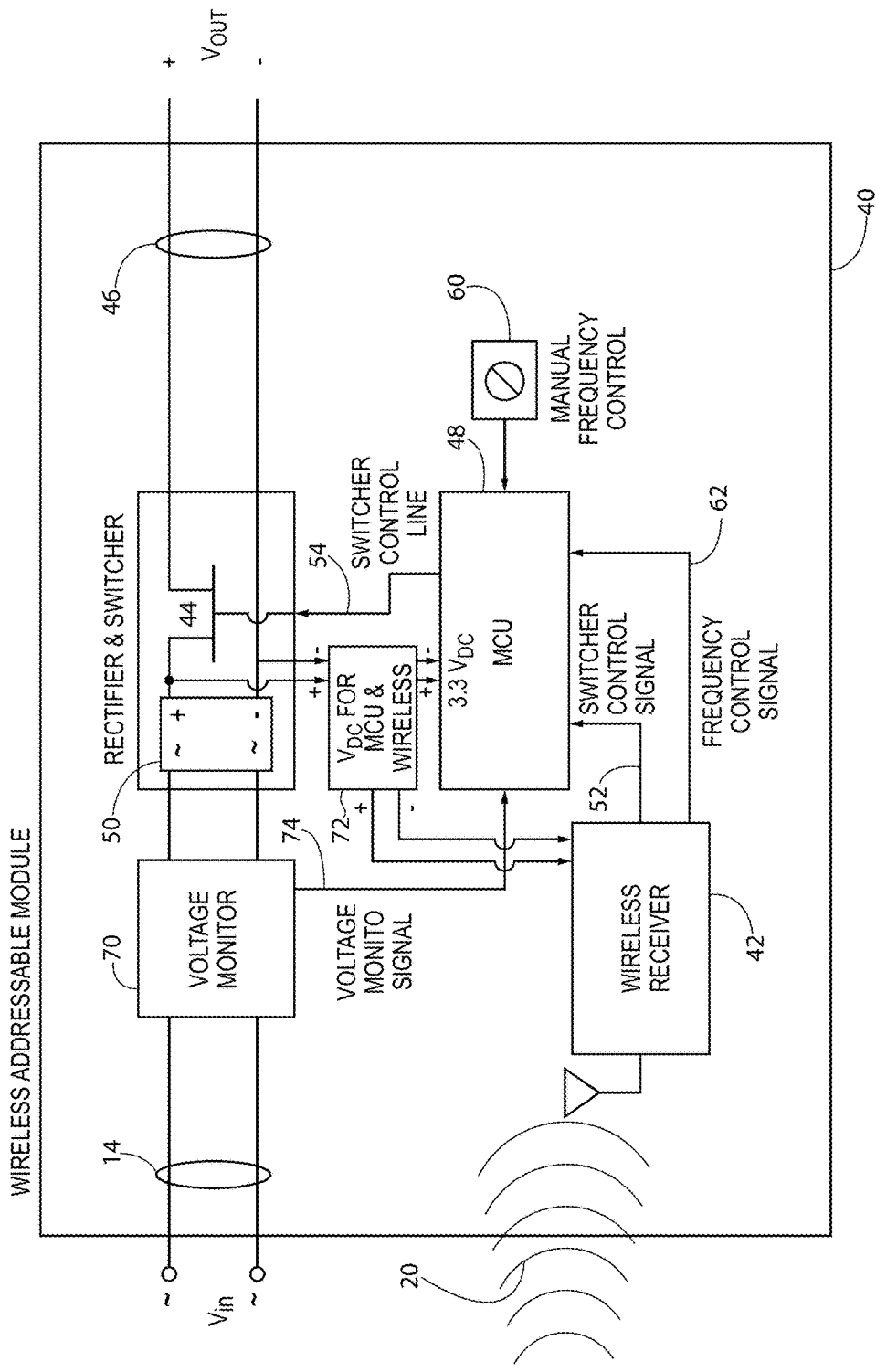
FIG. 3 is a medium-level block schematic block diagram of an exemplary wireless addressable dimmer module.

FIG. 3 shows an exemplary wireless addressable dimmer module 40. Wireless addressable dimmer module 40 comprises a wireless receiver 42, a switch 44 (a MOSFET in FIG. 3), and logic for actuating the switch 44 to modify the power signal 14 to generate a modified power signal 46 consistent with the dimming signal capable of dimming LED light sources (and other light sources) 18 that are generally considered to be non-dimmable with conventional dimmers. The wireless receiver 42 receives one or more wireless signals and generates a corresponding electrical signal, e.g., one or more analog or digital signals corresponding to the wireless signals.

In the following definitions of exemplary terms, both singular and plural forms of all terms fall within each meaning. Excepted where noted otherwise, capitalized and non-capitalized forms of all terms fall within each meaning:

"Logic," synonymous with "circuit" as used herein includes, but is not limited to, analog hardware, digital hardware, firmware, software and/or combinations of each to perform one or more functions or actions. For example, based on a desired application or needs, logic may include a software controlled processor, discrete logic such as an application specific integrated circuit (ASIC), programmed logic device, or other processor.

"Computer" or "processor" as used herein includes, but is not limited to, any programmed or programmable electronic device or coordinated devices that can store, retrieve, and process data and may be a processing unit or a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. Computer devices herein can have any of various configurations, such as handheld computers (e.g., so-called smart phones), pad computers, tablet laptop computers, desktop computers, and other configurations, and including other form factors. Logic may also be fully embodied as software.

"Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

"Data storage device," as used herein, means a device for non-transitory storage of code or data, e.g., a device with a non-transitory computer readable medium.

"Non-transitory computer readable medium," as used herein, means any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc.

In the exemplary embodiment of FIG. 3, the logic comprises a processor 48 having a memory circuit comprising one or more non-transitory computer readable media of one or more data storage devices. This memory circuit might include flash memory (or other solid state memory) and/or RAM and/or ROM memories, and/or one or more fixed disk drives and/or other memories. The memory circuit will have stored thereon logic modules for performing the various functions and processes described herein or a program to access such logic modules from a remote memory, such as a memory of access server (e.g., a browser program to access such logic modules from the server memory). In this example, processor 48 is preprogrammed to receive dimming data from the wireless receiver 42 and to use the dimming data to generate the modified power signal 46 consistent with the dimming data capable of dimming LED light sources (and other light sources) 18 that are generally considered to be non-dimmable with conventional dimmers. Such dimming data can be a desired discrete level of brightness, e.g., full on, off, medium, dim, etc., or a specific level of desired brightness along a spectrum, e.g., 100% on, 0% on, 33% on, 75% on, etc.

In exemplary embodiments, the processor 48 creates a modified power signal 46 that produces about the same relative brightness from the light source 18, 18*a*, 18*b*, etc., as requested by the dimming data. In addition, or in the alternative, in exemplary embodiments, the dimming data does not correlate to a specific desired degree of brightness per se, but represents a direction of intensity change as long as the signal is present. For example, the dimming data my make the light source 18 brighter or more dim as long as the signal is present.

The exemplary configuration of FIG. 3 includes a full wave rectifier 50 between the input 14 and the switch 44. Thus, in the exemplary configuration of FIG. 3, the switch 44 interrupts (i.e., "chops") a DC signal to create the modified output DC signal 46. FIG. 4 shows an exemplary output signal 46 generated by the exemplary circuit of FIG. 3 at three different zoom levels.

Figure 4A:
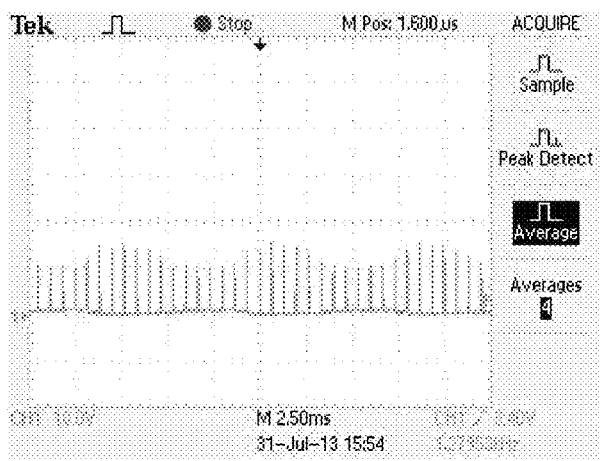
FIGS. 4A-4C show output signals generated by the exemplary circuit of FIG. 3, based on an exemplary dimmer control signal, at three different zoom levels.
Figure 4B:
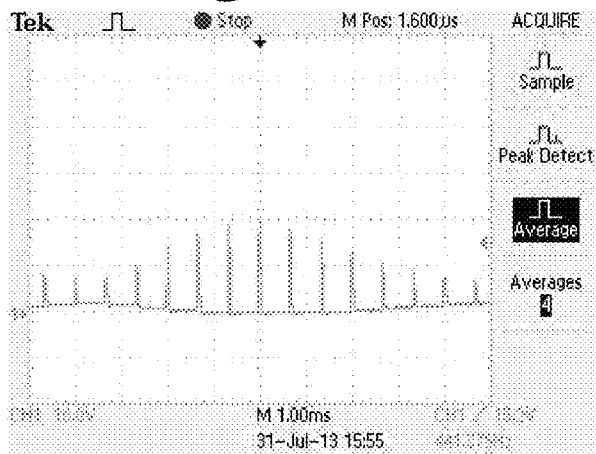
Figure 4C:
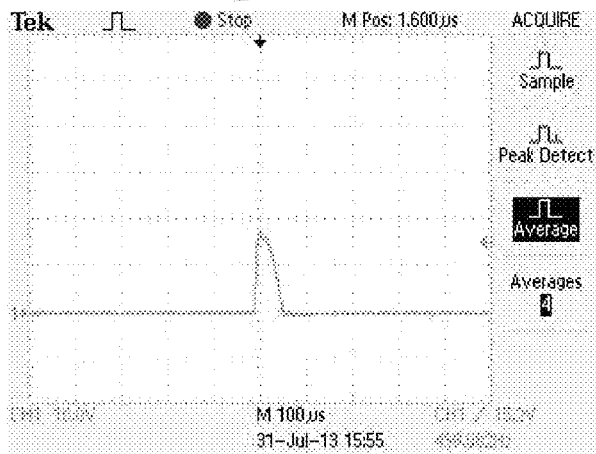

As can be seen in FIG. 4A, which is zoomed out, the exemplary output 46 comprises a number of voltage spikes that have an overall shape (envelope) that is a 60 Hz signal, like the ~12 VAC input signal 14. Also notice that the exemplary output 46 has only a very small percentage of the power of the input signal (the signal is off for the vast majority of the time). Zooming in, FIGS. 4B and 4C show that the individual spikes bear little or no resemblance to the ~12 VAC input signal 14. This is very different than typical dimmer circuits, which typically change either the voltage or the percentage of the input signal sine wave that passes through each cycle.

Figure 5A:
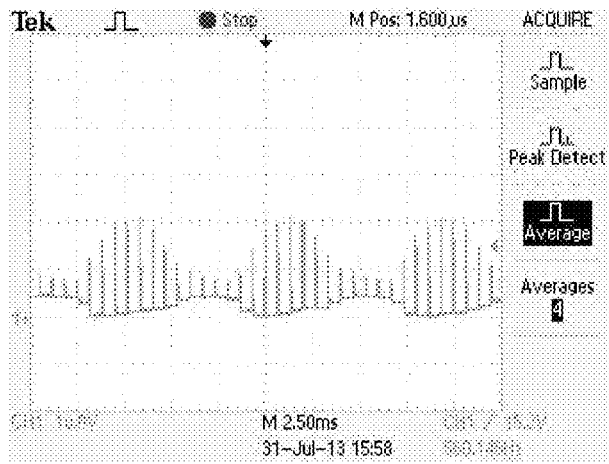
FIG. 5A-5C show output signals generated by the exemplary circuit of FIG. 3, based on a different exemplary dimmer control signal, at three different zoom levels.
Figure 5B:
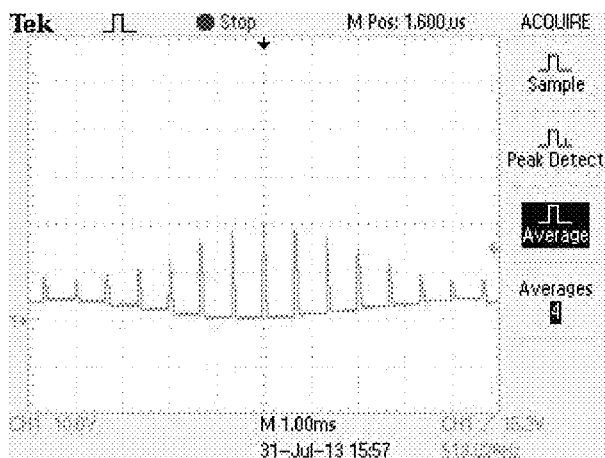
Figure 5C:
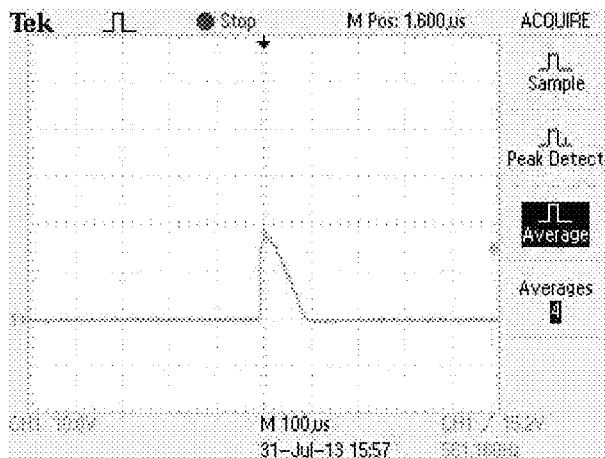

Returning to the exemplary configuration of FIG. 3, the dimmer data is in the form of an analog dimmer control signal 52, that is used by the processor 48 to generate a switch control signal 54 that turns the switch 44 on and off at a frequency at least ten times the frequency of the ~12 VAC input signal 14. For example, the analog dimmer control signal 52 can range between 0-3.3 VDC, with 0 VDC indicating off and 3.3 VDC indicating full brightness. FIGS. 4A-4C show an exemplary modified power signal 46 at an exemplary dimmer control signal 52 of 1.4 VDC. In contrast, FIGS. 5A-5C show three zoom levels of an exemplary modified power signal 46 at an exemplary dimmer control signal 52 of 2.0 VDC, which in this embodiment indicates that the light source 18 should be brighter than with the 1.4 VDC control signal of FIG. 4.

Comparing the zoomed-out signals in the 1.4 VDC and 2.0 VDC groups (FIGS. 4A and 5A respectively), one can see that both comprise a number of voltage spikes that have an overall shape (envelope) that is a 60 Hz signal, like the ~12 VAC input signal 14. Comparing the zoomed-in images in the 1.4 VDC and 2.0 VDC groups (FIGS. 4B-4C and 5B-5C respectively), the individual spikes bear little or no resemblance to the ~12 VAC input signal 14. Additionally, comparing the bottom images in the 1.4 VDC and 2.0 VDC groups, the 2.0 VDC control signal produces a wider pulse, which results in a brighter light source 18. In general, in this embodiment, the higher the control voltage 52, the wider the pulse in the output signal 46. Note the approximately triangular shape of the pulses in FIGS. 5A-5C.

In this embodiment, the processor 48 is programmed to cycle the switch off and on at about 1500 Hz, which is sufficient to dim many ordinary LED light sources without causing flashing and without causing damage to the LEDs or their respective driver circuits. Without intending to be bound by any particular theory, it is believed that the exemplary output signals 16, 46 switch so fast that the LED drivers never really have a chance to turn fully off between pulses, which dims the LEDs without causing them to appear to be flashing. In exemplary embodiments, this frequency is fixed, e.g., 1000-1500 Hz, and programmed into the processor 48. In alternate exemplary embodiments, the frequency defaults to a particular frequency, e.g., 1000-1500 Hz, but can be modified either by a hardware user interface, e.g., a potentiometer 60 or via a frequency control parameter passed wirelessly to the receiver 42 via the wireless signal(s) 20. The wireless signal(s) 20 output a frequency control signal 62 that is used by the processor 48 or other logic to modify the frequency with which the switch 44 is cycled off and on. A switch frequency as high as 20 kHz can be used in accordance with the teachings herein.

Figure 6A:
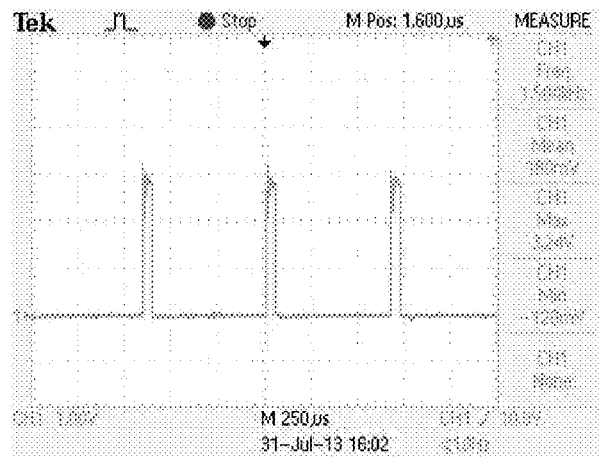
FIGS. 6A-6C show three different switch control signals at different dimmer control values.
Figure 6B:
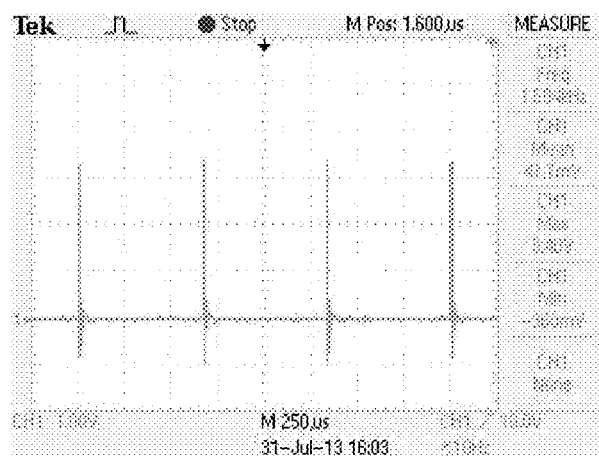
Figure 6C:
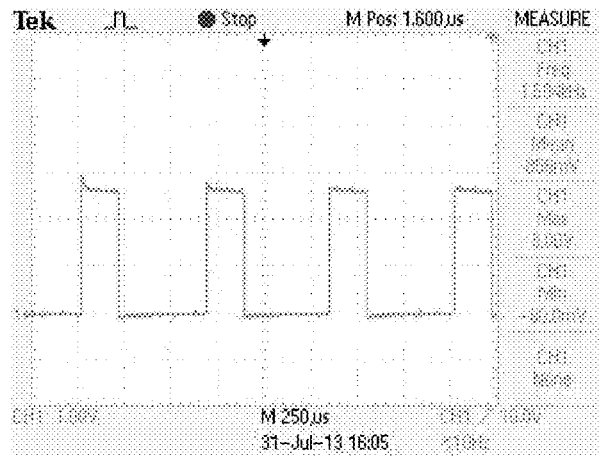

FIGS. 6A-6C shows three different switch control signals 54 at different dimmer control values 52, medium brightness, low brightness, and full brightness, respectively. As illustrated, the exemplary switch control signal 54 in this embodiment is a PWM signal, with a wider pulse corresponding to a wider base of the triangular pulses in the output signal 46.

If the input signal 14 is a DC signal, the exemplary circuit 40 will chop that DC signal at a high frequency (e.g., 200 Hz or higher) to dim the light source 18. In short, the MCU maps a certain control signal to a PWM duty cycle, which in turn switches a MOSFET ON/OFF based on the PWM signal. The smaller the duty cycle translates to a lower dim/light level. The circuit is basically turning the LED fixture ON/OFF using the power line instead of an enable pin or directly at the LEDs. The LED driver in the light source 18 regulates the current through the LEDs instead of the switching circuit. If an AC voltage is applied to the circuit then the frequency (driving the switcher) will be around 1 kHz or higher. If the input voltage is DC then the frequency (driving the switch 44) can be around 200 Hz or higher.

Figure 7A:
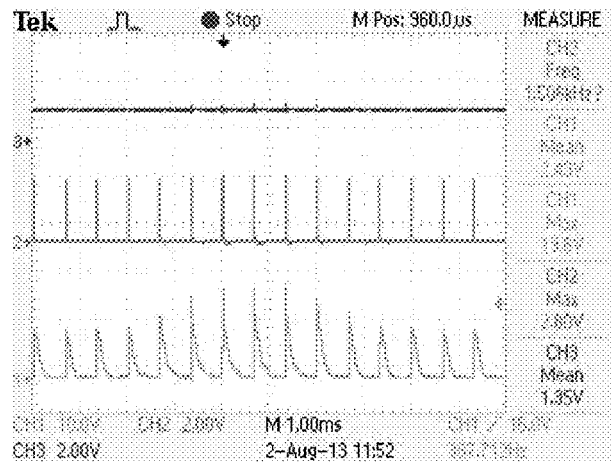
FIGS. 7A-7C each show a dim control signal, switch control signal, and output signal for each of three different dim levels of an exemplary dimmer module with an AC power input.
Figure 7B:
Figure 7C:
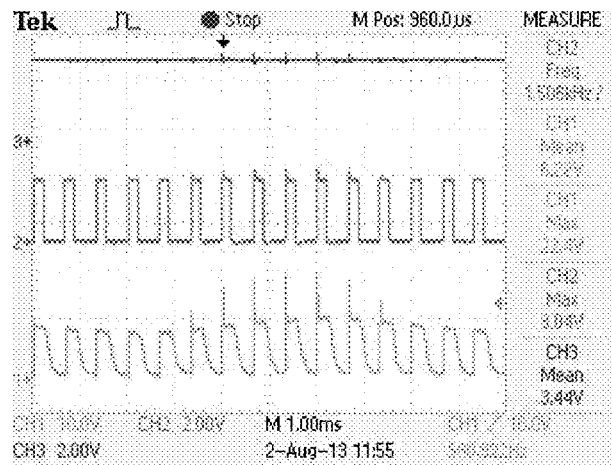
Figure 8A:
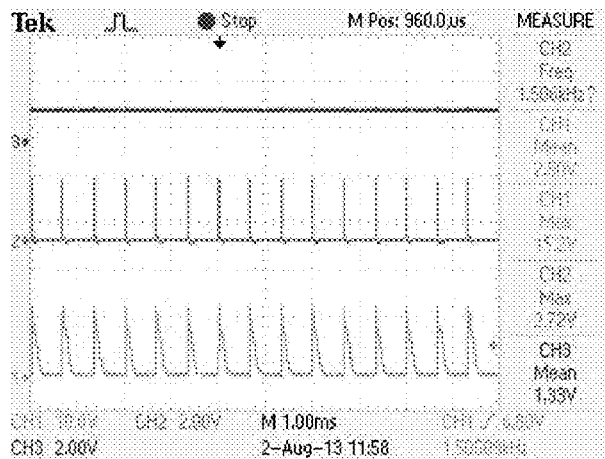
FIGS. 8A-8C each show a dim control signal, switch control signal, and output signal for each of three different dim levels of an exemplary dimmer module with a DC power input.
Figure 8B:
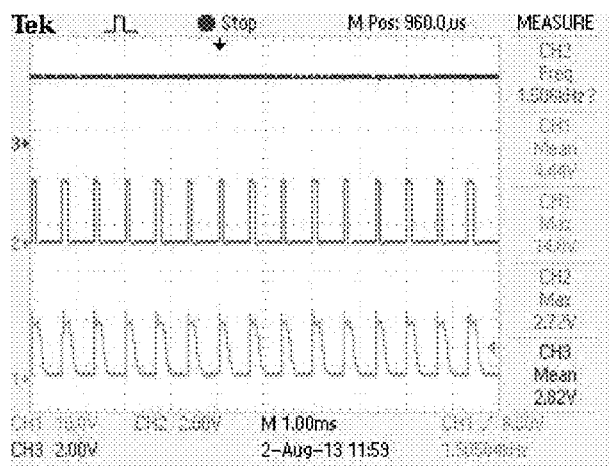
Figure 8C:
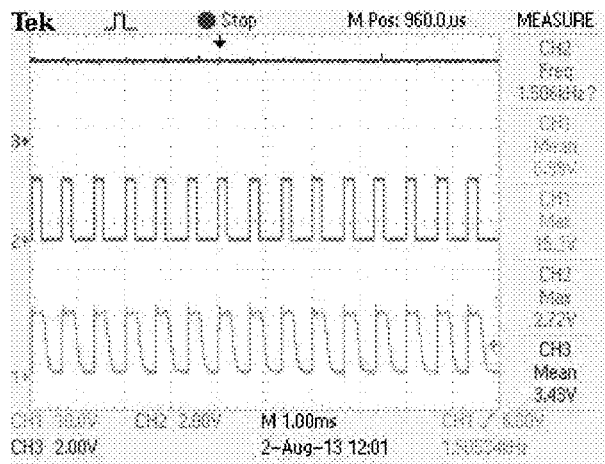
Figure 11:
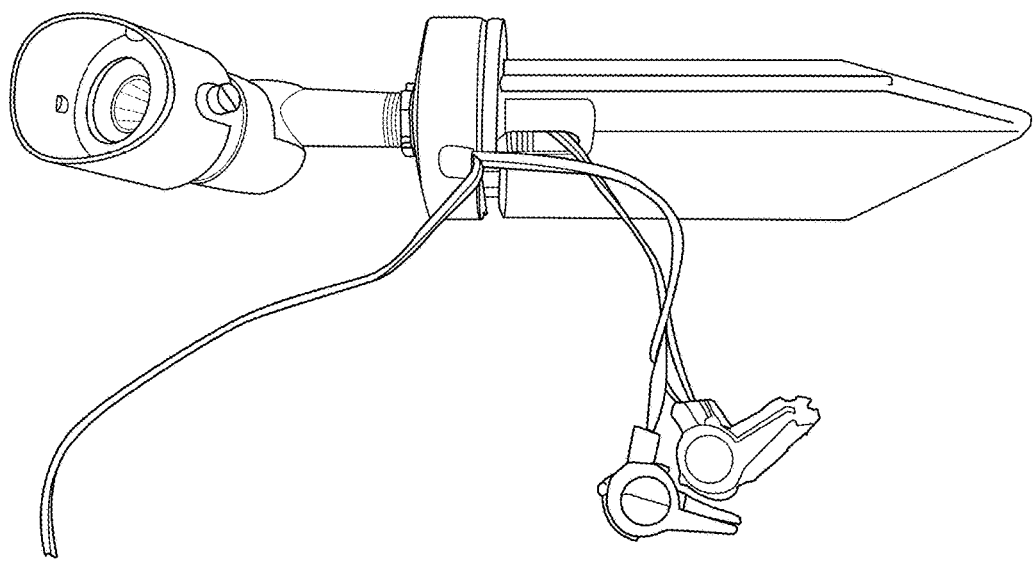
FIG. 11 is an image of an exemplary dimmer module, light and stake in a connected position.
Figure 12:
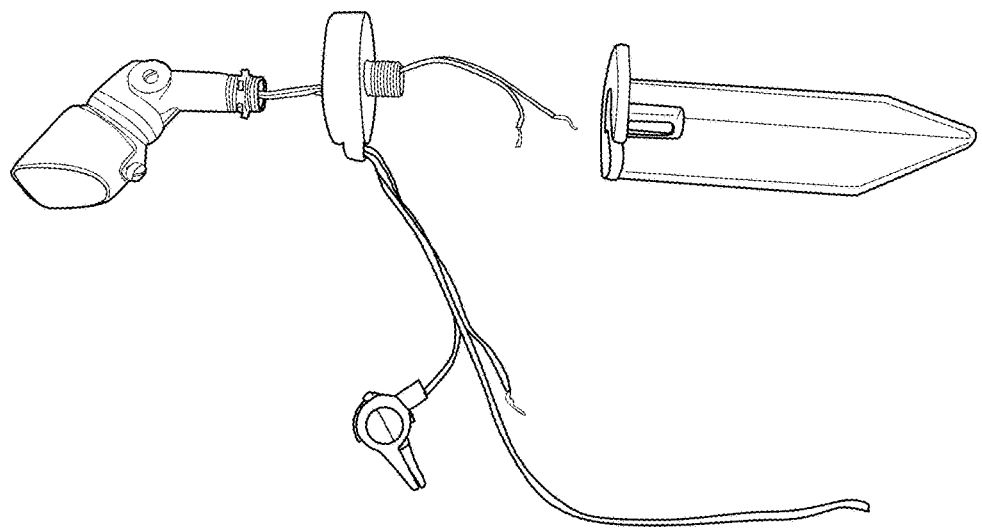
FIG. 12 is an image of an exemplary dimmer module, light and stake in a disconnected position.
Figure 13:
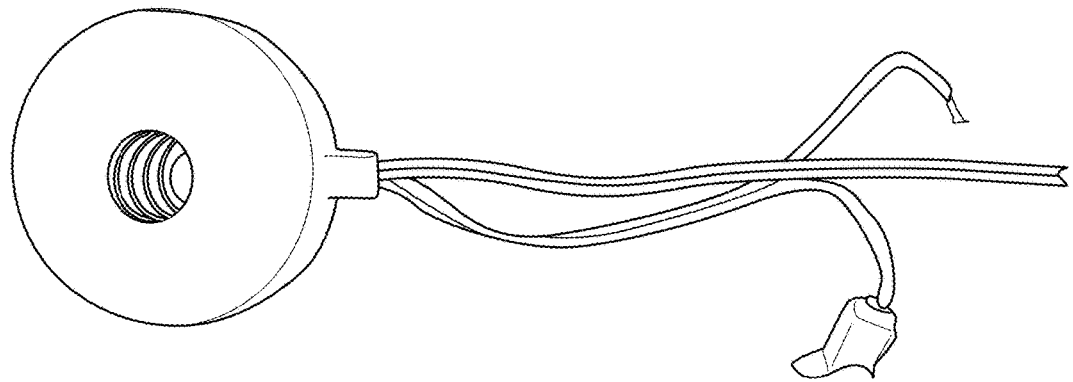
FIG. 13 is an image of the upper face of an exemplary dimmer module.
Figure 14:
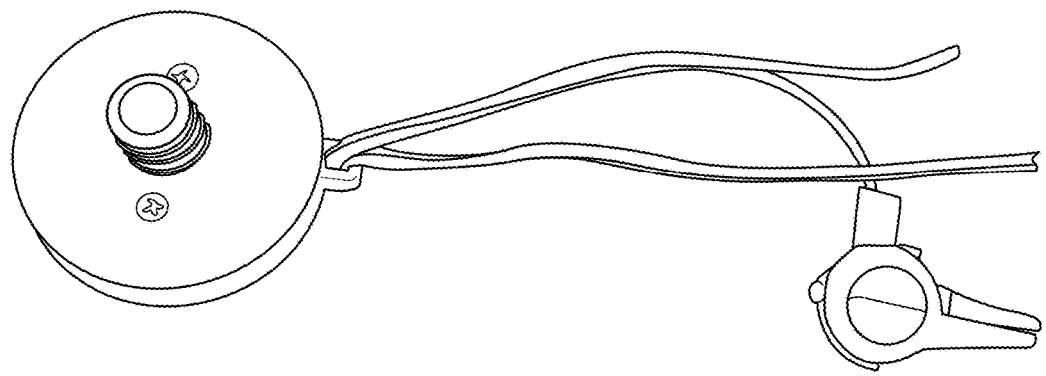
FIG. 14 is an image of the lower face of an exemplary dimmer module.
Figure 15:
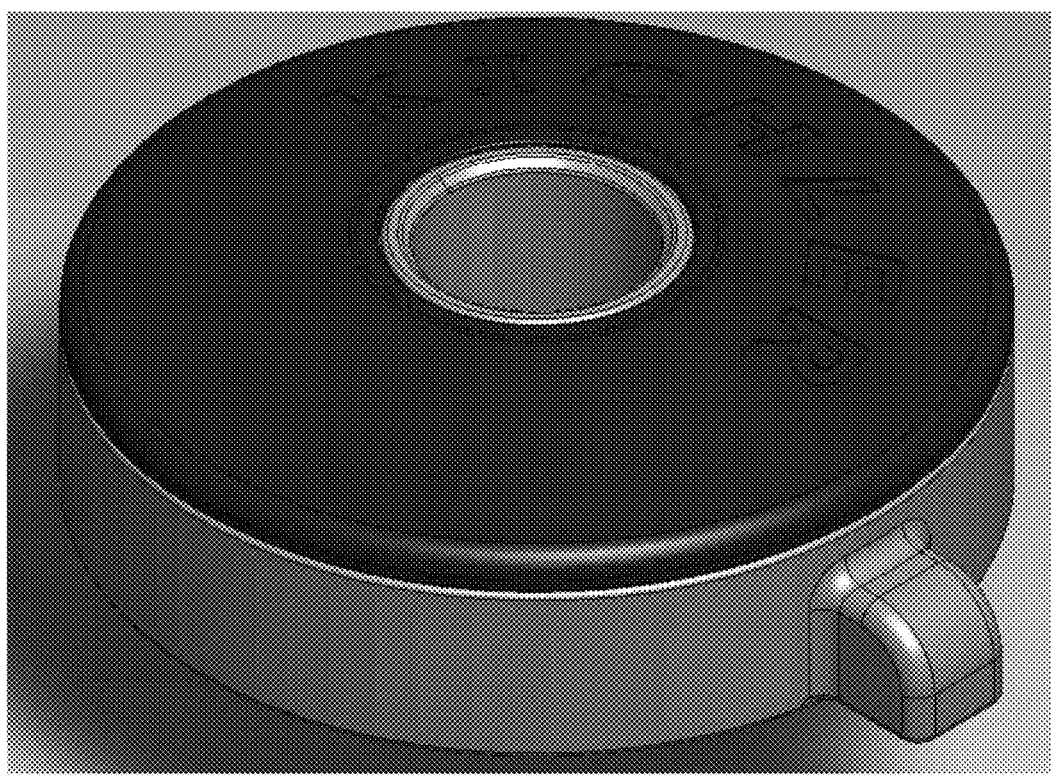
FIG. 15 is an isometric rendering of the upper surface of an exemplary dimmer module.
Figure 16:
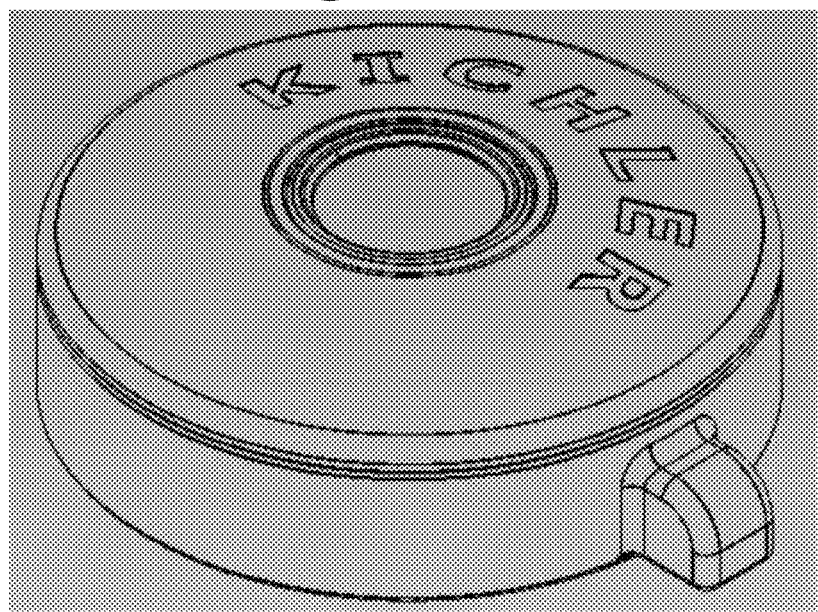
FIG. 16 is an isometric wire frame view of an exemplary dimmer module.
Figure 17:
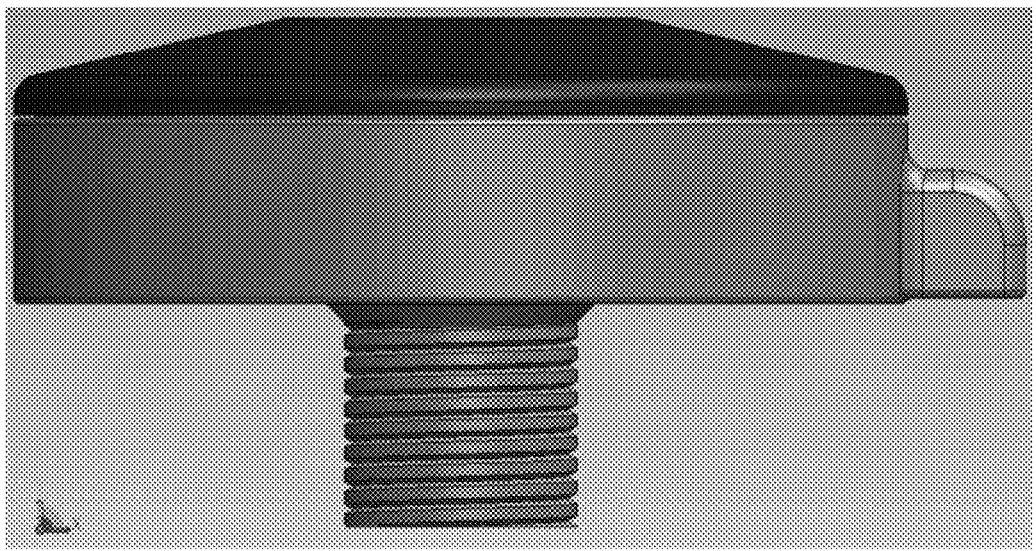
FIG. 17 is a rendering of a side view of an exemplary dimmer module.
Figure 18:
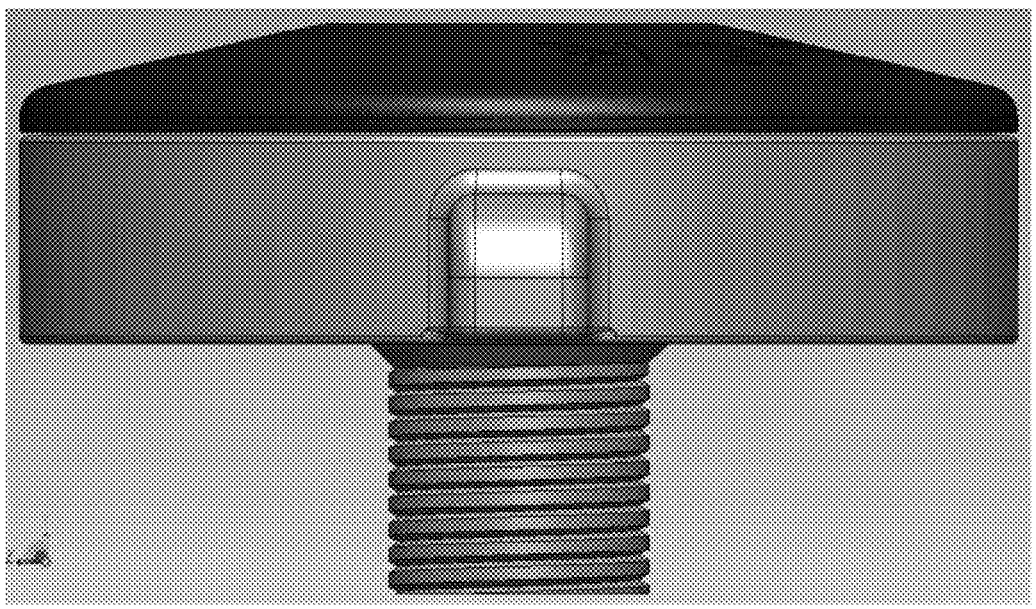
FIG. 18 is a rendering of another side view of an exemplary dimmer module.
Figure 19:
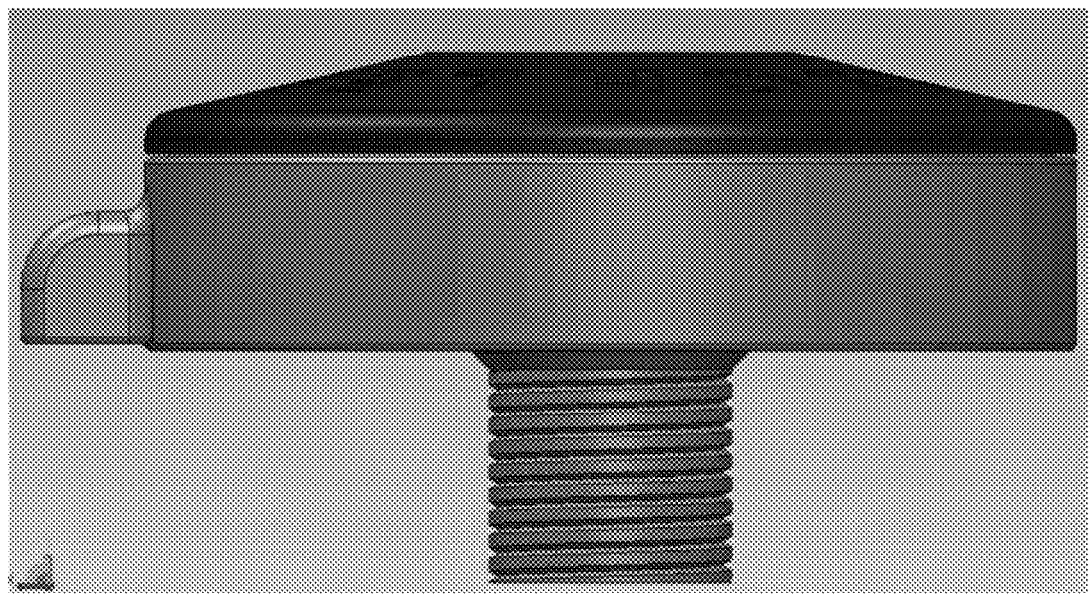
FIG. 19 is a rendering of yet another side view of an exemplary dimmer module.
Figure 20:
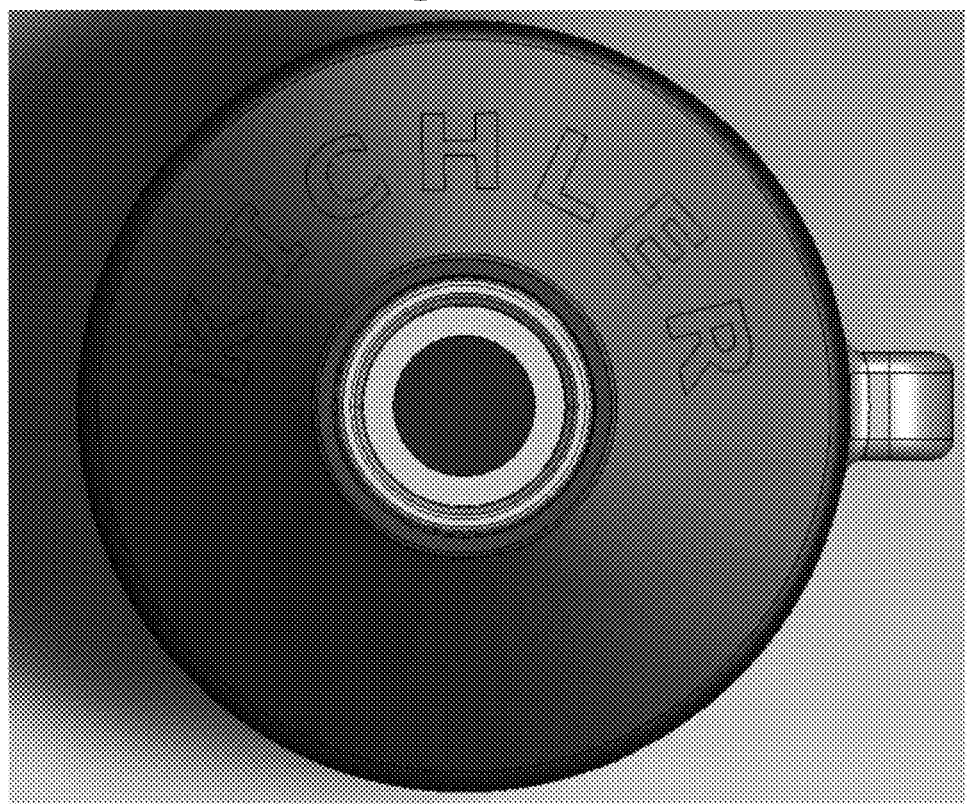
FIG. 20 is a rendered top view of an exemplary dimmer module.
Figure 21:
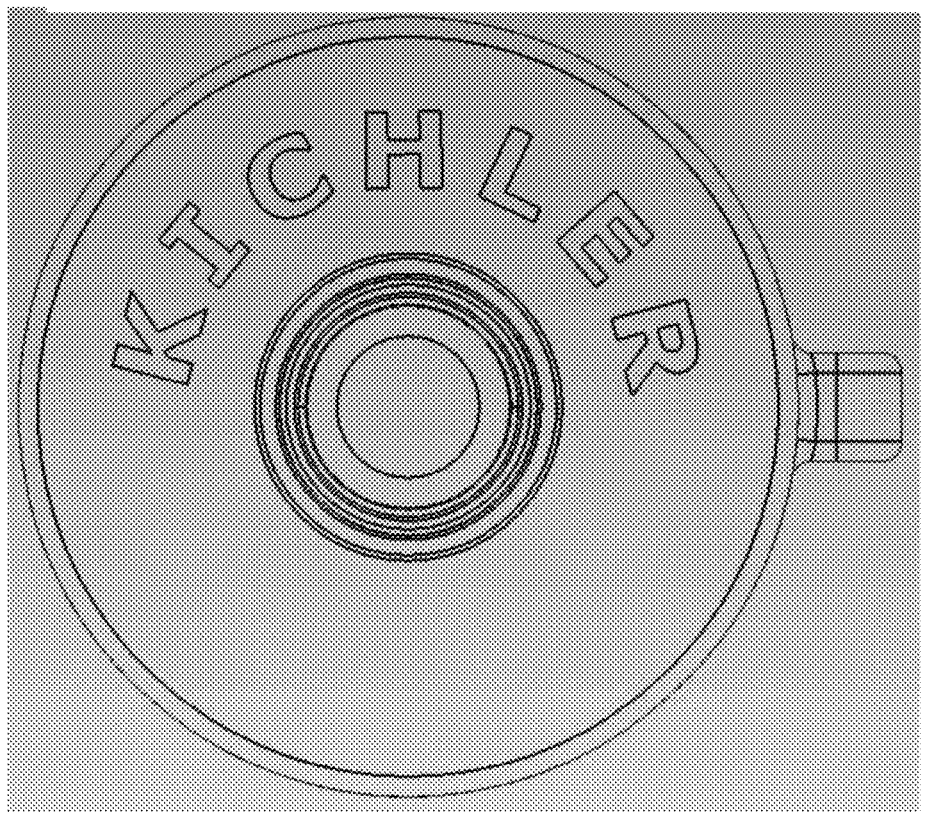
FIG. 21 is a wire frame top view of an exemplary dimmer module.
Figure 22:
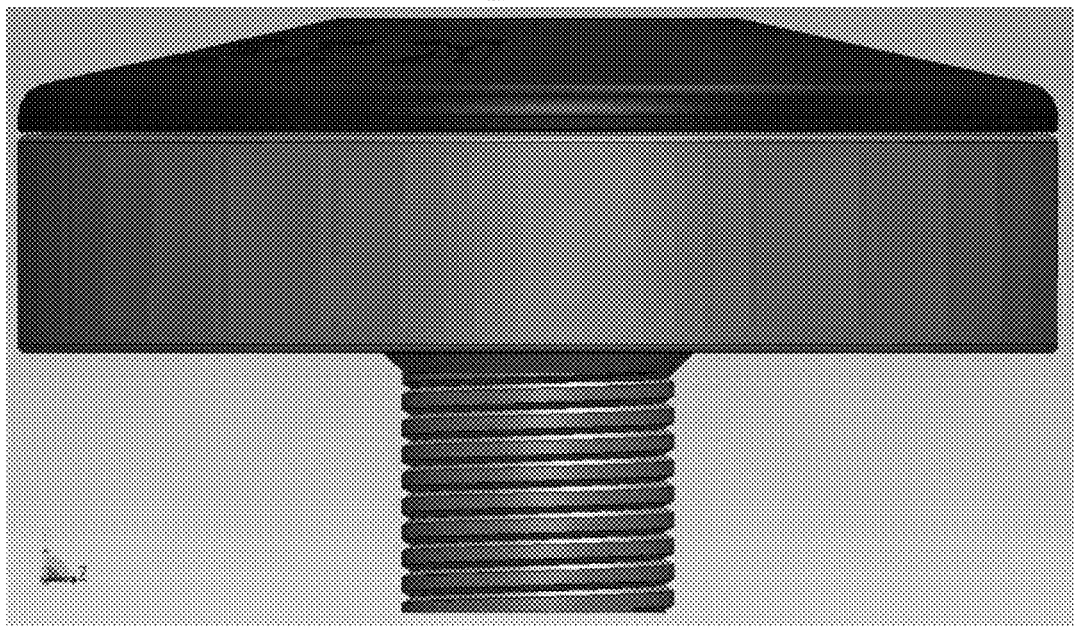
FIG. 22 is a rendering of one more side view of an exemplary dimmer module.
Figure 23:
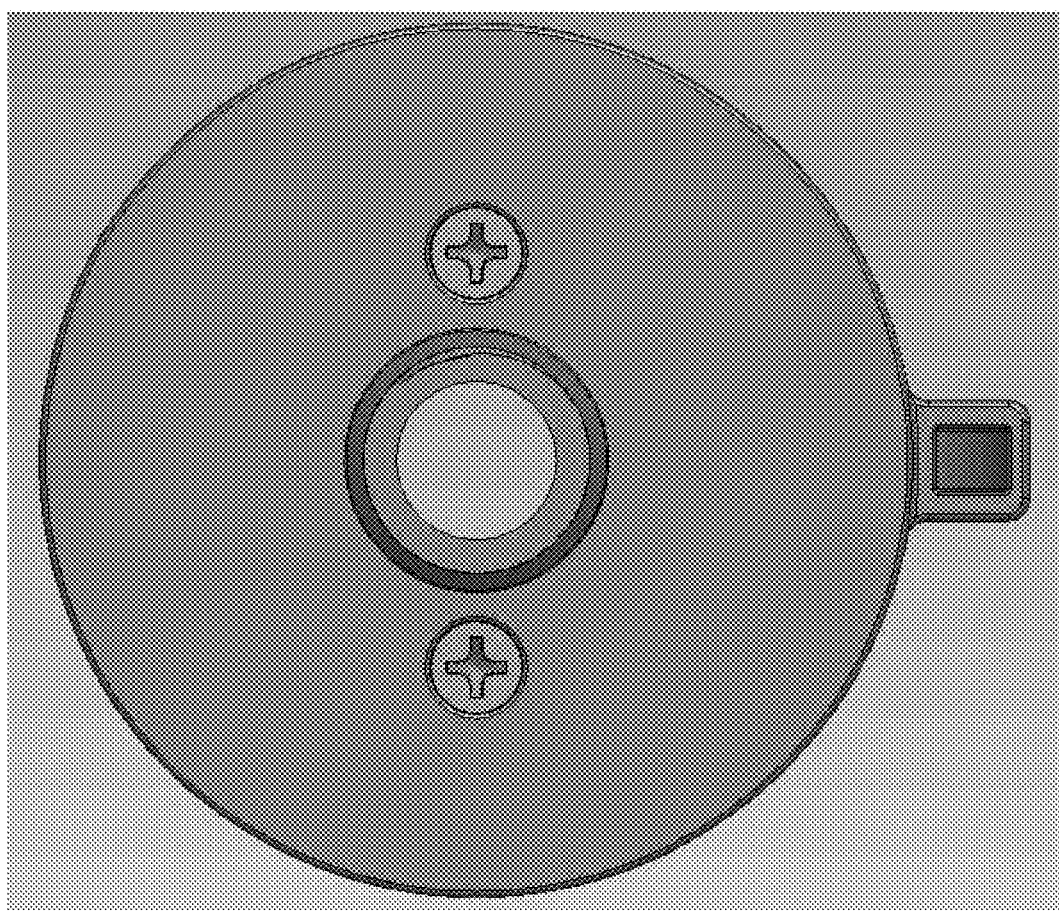
FIG. 23 is a rendered bottom view of an exemplary dimmer module.
Figure 24:
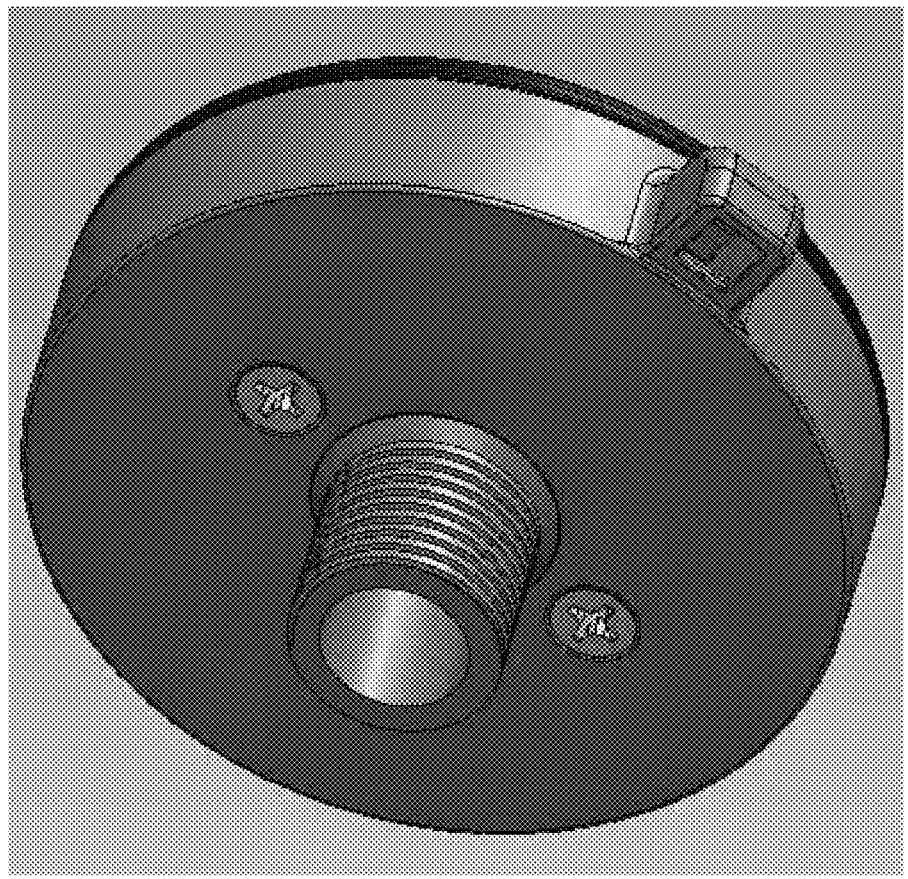
FIG. 24 is an isometric rendering of the lower surface of an exemplary dimmer module.

FIGS. 7A-7C show three different dimming signals for an AC input 14. FIGS. 8A-8C show three different dimming signals for an a DC input 14. FIGS. 7A-7C and 8A-8C each 3 signals: progressively brighter dim control signals 52, the resulting PWM switch control signals 54, and the resulting the output signals 46. CH1 (the bottom signal in each image) is the output 46 measured at the output which connects to the LED fixture, CH2 (the center signal in each image) is the PWM signal going to the switching circuit, and CH3 (the top signal in each image) is the control voltage which comes from the wireless device. Please note that this signal does not need to be an analog signal, it could be PWM, I2C, SPI, etc depending on the wireless device or if another form of control is connected to the device. In this embodiment, the signal actually coming from the wireless receiver (an NXP device) is PWM converted to an analog signal using a low pass signal for simplification.

FIGS. 7A-7C show three different dim levels for an exemplary accent light with an AC voltage input to the wireless module. FIG. 7A is a low dim level and FIG. 7C is a high dim level. It is possible to set the duty cycle of the PWM control line to 100% to increase the light, in this embodiment the range is limited to ensure the output current to the LED fixture remains in a preferred range. A nonlinear action in output current may be observed when sweeping the PWM control line from 0% to 100%. Depending on the input voltage to the wireless addressable dimmer module 40, the PWM range may be limited so that the input current to the fixture is within a preferred current output range to match non-dimmable fixtures.

FIGS. 8A-8C show three different dim levels for an exemplary accent light with a DC voltage input to the wireless module. No code was changed or modifications were made to the circuit—it is the same setup. The only difference between the embodiments producing the outputs of FIGS. 7A-7C and FIGS. 8A-8C is that the AC source is removed and a 15 Volt DC source is connected to the wireless addressable dimmer module 40. FIG. 8A is a low dim level and FIG. 8C is a high dim level.

Returning again to FIG. 3, in exemplary embodiments, the voltage of the input signal 14 is variable, e.g., in landscape lighting systems or other systems where significant power line lengths cause voltage drops that decrease the input voltage from nominal. For example, in landscape lighting systems, the input voltage can vary between 9-12 VAC depending on how close to the transformer the landscape fixture is. This can cause undesired variabilities, e.g., a signal that is 30% of a 12 volt signal will cause light source 18 to be much brighter than a signal that is 30% of a 9 volt signal. To accommodate for such variability, in exemplary embodiments, the wireless addressable dimmer module 40 can have an optional voltage monitor 70 that determines the voltage of the input signal 14 and generates a voltage monitor signal 72 that is used by the processor 48 (or other logic) to more accurately control the switch 44. The switch 44 generates an output signal 46 that gives the desired brightness in the light source 18 in response to the dim control signal 52.

The voltage monitor 70 can be implemented with a simple low-pass filter and logic level converter. For example, in exemplary embodiments, the processor 48 has a lookup table that automatically (without human intervention) correlates input voltage to a PWM percentage range, e.g., for a 9 VAC input signal, it uses the range of 20-70% PWM on control signal 54 for a full, linear dimming range, but for a 12 VAC signal, it uses the range of 0-30% PWM on control signal 54 for a full, linear dimming range The processor 48 automatically compensates for a reduced input voltage by increasing the dimming range applied to the switch 44. Those skilled in the art can determine the values of such a table without undue experimentation by incrementally varying the input voltage and, with a fixed input voltage, sweeping the dimming signal 52 from 0-100% and seeing the effect on the particular light source 18. In the alternative, one can use the knowledge of the voltage level going into the circuit as a multiplier for the duty cycle, to make sure that the light at the beginning of the run has almost the same light output as the one on the end at the same dim level.

The exemplary configuration of FIG. 3 can control (e.g., dim) LED light sources, LED retrofit light sources, low-powered LED light sources, incandescent light sources, halogen light sources, Gen 1 (LED) light sources, and Radiax light sources, and thus can control (e.g., dim) light fixtures with one or more of these light sources. Such different light source types use different amounts of power. Accordingly, the dim control signal 52 (and also the corresponding transmitted dimming data 20) can be varied to provide for a full range of brightness for the different light types, both in the situation when the input voltage is expected to be constant (e.g., in 120 VAC lighting systems) and when the input voltage is expected to vary (e.g., in low voltage 9-12 VAC landscape lighting systems). A lookup table can be used to store data for the processor 48 to use to provide a full range of dimmer control for the various lighting types. Those skilled in the art can determine the values of such a table without undue experimentation by incrementally varying the lighting type, and the input voltage if warranted, and, with a fixed input voltage, sweeping the dimming signal 52 from 0-100% and seeing the effect on the particular light source 18. In the alternative, such tables can be stored in the wireless transmitter 22, e.g., a computer application (an "app") executing on a computer or even a handheld computer, such as a smart phone, pad computer, or tablet computer, that can be used to remotely dim, via the dimming module, one or more LED light sources (and other light sources) that are generally considered to be non-dimmable with conventional dimmers.

Additionally, exemplary circuit 40 can also have a power circuit 74 that provides power for the wireless receiver 42, the processor 48, etc.

FIG. 9 shows an exemplary lighting control system 100. The lighting control system of FIG. 4 includes a communication source, e.g., a connection 102 to the Internet, a router, and a gateway, which connects to the Internet via the router. The gateway, which can be an iQ Logic gateway, accepts dimming input from various apps, e.g., the iQ Logic Smart-Qloud app, and transmits wireless signals to various light sources. In exemplary embodiments, the dimming modules 12, 40 of the present disclosure are configured to receive wireless signals from the gateway, e.g., WiFi, ZigBee, or Z-Wave signals, or other wireless signals, and receive dimming data and other data from via the wireless signal. Exemplary system 100 includes a landscape transformer and/or a DC power supply to provide an input signal 14 to each of the light fixtures shown (nominally 12 VAC or 12 VDC).

Each of the light fixtures in FIG. 9 has its own wireless addressable dimming module 12, 40 (each shown in FIG. 9 as a rectangle emitting a wireless signal). Thus, each fixture is separately dimmable and separately controllable with respect to power need to provide a full range of linear dimmability. Dim control signals from the computers travel either to the router to the gateway to the modules 12, 40 or to the Internet to the router to the gateway to the modules 12, 40, depending on how close the computer is to the router and how the computer is configured (non-WiFi devices near the router still go to the gateway via the Internet).

Another exemplary system is shown in FIG. 10. Like FIG. 2, FIG. 10 shows a plurality of light fixtures/light sources in a zone, with each zone controlled by a single wireless addressable dimming module 12, 40 (each shown in FIG. 10 as a rectangle or puck emitting a wireless signal). Like the lighting control system of FIG. 9, the system of FIG. 10 includes a communication source, e.g., a connection to the Internet, a router, and a gateway, which connects to the Internet via the router. The gateway, which can be an iQ Logic gateway, accepts dimming input from various apps, e.g., the iQ Logic SmartQloud app, and transmits wireless signals to various light sources. In exemplary embodiments, the dimming modules 12, 40 of the present disclosure are configured to receive wireless signals from the gateway, e.g., WiFi, ZigBee, or Z-Wave signals, or other wireless signals, and receive dimming data and other data via the wireless signal.

The exemplary system of FIG. 10 includes a landscape transformer and/or a DC power supply to provide an input signal 14 to each of the light fixtures shown (nominally 12 VAC or 12 VDC). The wireless addressable dimming modules 12, 40 in FIG. 10 modify the power signal going to the zone instead of the power signal going to each individual light fixture, as in FIG. 9. Thus, each zone is separately dimmable and separately controllable, which may or may not provide a full range of linear dimmability (fixtures with different power requirements in the same zone might not appear to be dimmed to the same level). Dim control signals from the computers travel either to the router to the gateway and then to the modules 12, 40 or to the Internet, to the router, and then to the gateway to the modules 12, 40, depending on how close the computer is to the router and how the computer is configured (signals from non-WiFi Internet capable devices, e.g., some smart phones, near the router will go to the gateway via the Internet).

FIGS. 11-24 show an exemplary external configuration for the wireless addressable dimming module 12, 40—an annular puck, with a threaded opening on one side to accept and couple to the threaded stem of a landscape fixture and a threaded extension on the other side to couple to and be secured to the threaded opening of a landscape lighting stake. This configuration permits prior art landscape fixtures to be retrofitted with the wireless addressable dimming module 12, 40 taught herein. In exemplary embodiments, the puck is sealed against moisture. A metal casting provides the bottom, the threaded extension, and a central portion forming the threaded opening. A plastic upper portion permits RF wireless signals to pass from outside into the puck to the antenna of the wireless addressable dimming module 12, 40.

As can be seen in FIGS. 11-24, to install the puck on a lighting fixture, one unscrews the threaded stem of the landscape fixture from the threaded opening of the landscape lighting stake, threads the wire for the fixture through the central opening of the puck, twists the puck onto the stake to threadably secure the threaded extension of the puck to the threaded opening of the landscape lighting stake, twists the threaded stem of the fixture onto the puck to threadably secure the light fixture to the puck, electrically connects the power cable to the puck, and electrically connects the puck output to the light fixture power cable. Although the figures show a particular landscape fixture being used, as shown in FIGS. 9 and 10, virtually any landscape fixture can be used with the wireless addressable dimming modules 12, 40 taught herein.

In the alternative, in exemplary embodiments, the wireless addressable dimming module 12, 40 circuitry is added directly to the enclosure of an LED or other fixture to permit dimming via a wireless transmitter 22.

As mentioned above, the light sources 18 can be controlled (e.g., dimmed) via software executing on a computer, e.g., an App executing on a smart phone (e.g., an iPhone) or a tablet computer (e.g., an iPad). In exemplary embodiments, such software generates a graphical interface for adding light sources for control and controlling light sources and transmits corresponding data to the wireless addressable dimming modules 12, 40, as discussed herein. In exemplary embodiments, such software performs any one or any two or more of the following while adding light sources for control:

A. Provide a software user input (not shown), e.g., an icon or other software user input with which the user can indicate a desire to add a light to be controlled by that computer;

B. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can identify the specific wireless addressable dimming modules 12, 40 being added;

C. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can indicate whether the wireless addressable dimming modules 12, 40 is controlling a zone or an individual fixture and enter a name for that fixture or zone;

D. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise input the type of light source 18 (or collection of light sources in the zone), e.g., an LED light source, an LED retrofit light source, a low-powered LED light source, an incandescent light source, a halogen light source, a Gen 1 (LED) light source, or a Radiax light source, etc.;

E. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise input the power used by the light source 18 (or by the collection of light sources in the zone), e.g., a specific amount in milliamps or within a particular range of milliamps, to permit the wireless addressable dimming modules 12, 40 to apply an appropriate dimming range for that fixture or zone (e.g., a higher dimming range for a higher power zone/fixture or a lower dimming range for a lower power zone/fixture);

F. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise increase or decrease the frequency of switching the switch 44 of the wireless addressable dimming module 12, 40 to attempt to decrease flickering of any of the light sources 18;

G. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise input an incremental brightness offset (such as a percentage) to increase or decrease the brightness of that particular fixture or zone for one reason or another (e.g., to manually compensate for power signal line losses or the age of light source);

H. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise input whether the processor 48 is to automatically compensate for reduced voltage at the input 14, as discussed herein;

I. (a) Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can cause the module 12, 40 to slowly increase the switching frequency (frequency at which the switch 44 is actuated, e.g., the PWM frequency if PWM is used to control switch 44) from a lower value (e.g., any of the lower frequency end points herein, e.g., 600 Hz) to a higher value (e.g., any of the higher frequency end points herein, e.g., 2000 Hz) (or vice versa, i.e., start at the higher frequency and slowly decrease the switching frequency to the lower value), (b) provide another software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can indicate to the App and/or the module 12, 40 when the light source begins to flicker, and (c) provide another software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can indicate to the App and/or the module 12, 40 when the light source ceases flickering to interactively find the appropriate switching frequency for that lighting fixture. In exemplary embodiments, a frequency between these end points is to control the switch 44 for that fixture, e.g., sent by the remote transmitter 22 or set in the module 12, 40; and/or J. (a) Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can cause the module 12, 40 to slowly increase the PWM pulse width (or other measure of output power in the output signal 44) from a lower value (e.g., 0% or any of the lower percentage end points herein) to a higher value (e.g., 100% or any of the lower percentage end points herein, e.g., 70%) (or vice versa, i.e., start at the higher percentage and slowly decrease the percentage to the lower value), (b) provide another software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can indicate to the App and/or the module 12, 40 when the light source begins to illuminate (or begins to dim from full brightness, if decreasing the percentage), and (c) provide another software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can indicate to the App and/or the module 12, 40 when the light source is at full brightness (or turns off, if decreasing the percentage) to interactively find the appropriate dimming range (e.g., PWM percentage) for that lighting fixture. In exemplary embodiments, these end points are used to map a desired brightness into an appropriate PWM switch control signal, such as using the desired degree of brightness as a mathematical scalar between the two endpoints, e.g., 50% desired brightness would be set at the percentage half way between the two determined endpoints.

In exemplary embodiments, such software performs any one or any two or more of the following while controlling light sources and transmitting corresponding data to the wireless addressable dimming modules 12, 40, as discussed herein:

1. Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select one or more wireless addressable dimming modules 12, 40 (i.e., one or more corresponding fixtures or zones) to control;

2. Provide a software user input (not shown), e.g., one or more pull-down menus or drop-down menus, one or more icons or sliders, and/or one or more select-one radio button sets, and/or select-all radio button sets, and/or one or more freeform text fields into which text can be freely typed with a computer keyboard, with which a user can control the brightness of a light source 18 or selected light sources or a zone coupled to one or more selected wireless addressable dimming module 12, 40, such as inputting a brightness value (e.g., a percentage) or a range (high, medium, low, off) or the like;

3. Provide a software user input (not shown), e.g., one or more pull-down menus or drop-down menus, one or more icons or sliders, and/or one or more select-one radio button sets, and/or select-all radio button sets, and/or one or more freeform text fields into which text can be freely typed with a computer keyboard, with which a user can incrementally increase or decrease the brightness of a light source 18 or selected light sources or a zone coupled to one or more selected wireless addressable dimming module 12, 40, with each actuation of that user input (and/or continuously increase or decrease the brightness of a light source 18 or a zone coupled to a wireless addressable dimming module 12, 40 while the user input is continually actuated); and/or 4. Provide a graphical display displaying to a user an indication of how brightly a selected fixture or zone is being controlled, e.g., high, medium, low, or off or a specific percentage.

Figure 25:
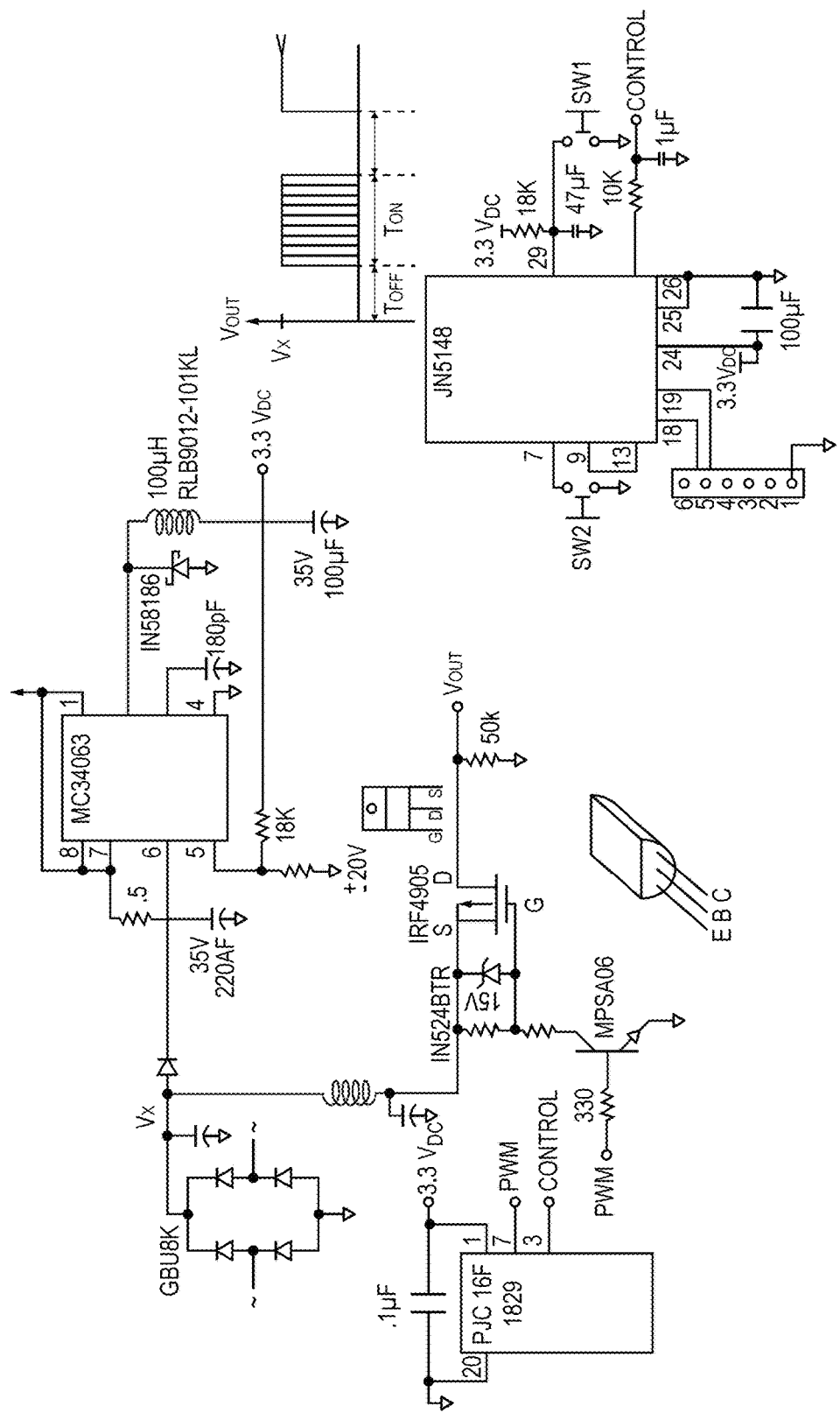
FIG. 25 shows an exemplary schematic diagram for an exemplary circuit implementation of a wireless addressable dimming module.
Figure 26:
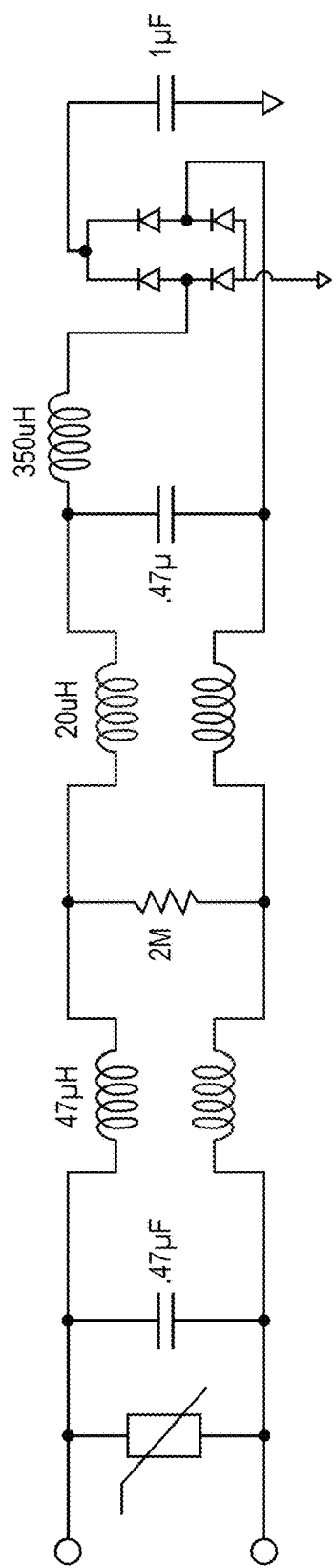
FIG. 26 shows an exemplary schematic diagram for a front end circuit to a wireless addressable dimming module.

FIG. 25 shows an exemplary schematic diagram for an exemplary circuit implementation of the wireless addressable dimming module 40 of FIG. 3. The wireless receiver 42 may be implemented with NXP's JN5148 microcontroller and associated circuitry (line 52 is the "control" signal in FIG. 25 and is a 0-3.3 VDC analog voltage corresponding to the dimming data received by the receiver), the processor 48 may be implemented with a PIC and associated circuitry (the line 54 is "PWM" in FIG. 25), the switch 44 may be implemented with the IRF4905 HEXFET® Power MOSFET, the rectifier 50 may be implemented with the Fairchild's GBU8K bridge rectifier, and the power circuit 74 is implemented with the Motorola MC34063 control circuit and associated circuitry. The optional voltage monitor 70 is not implemented in the exemplary circuitry of FIG. 25. FIG. 26 shows a front end to the circuit of FIG. 25.

Many LED driver circuits are constant current generating circuits. The circuit of FIG. 25 functions with at least the following LED driver circuits (i.e., off, on, and approximately linear dimming range in-between):

Kichler Lighting's retro-fit LED bulbs.

Kichler Lighting underwater driver package. This driver is a step down converter and is based on Monolithic Power Systems' MP2489 LED light driver. The period of the drive is set to 5 μS and is roughly 200 kHz. For this driver to be able to have a large enough dimming range, the PWM frequency may need to be increased to around 11 kHz on the wireless dimming module.

Kichler Lighting Path Light Driver, based around Texas Instruments' TL494 PWM controller and setup in a Buck converter and set to approximately 100 kHz. The wireless module is able to control the dimming rate of the driver very well at around 1 kHz PWM frequency.

Kichler Lighting Gen 1 LED driver. Driver is based on Texas Instruments' TL494 PWM controller and is configured as a fixed frequency Buck converter. The driver may be dimmable with the wireless dimming module in a range of about 1000-2000 Hz, e.g., at about 1000 Hz.

Kichler Lighting Gen 2 LED driver. This driver is based on the Texas Instruments' LM3429 N-Channel controller and is a buck-boost topology. It is set to a 700 kHz operating frequency. The driver may be dimmable with the wireless dimming module in a range of about 1000-2000 Hz, e.g., at about 1000 Hz.

Figure 27A:
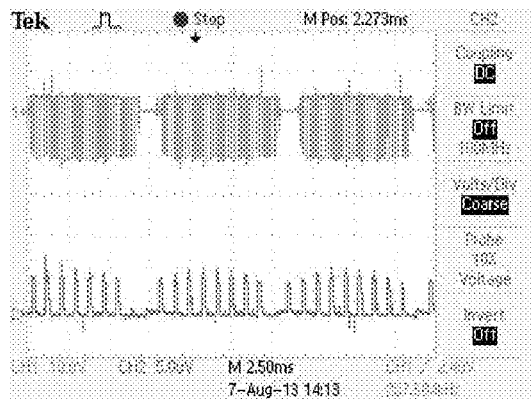
FIGS. 27A-27E show the voltage across a switching inductor and the input voltage for an exemplary wireless addressable dimming module according to FIG. 25.
Figure 27B:
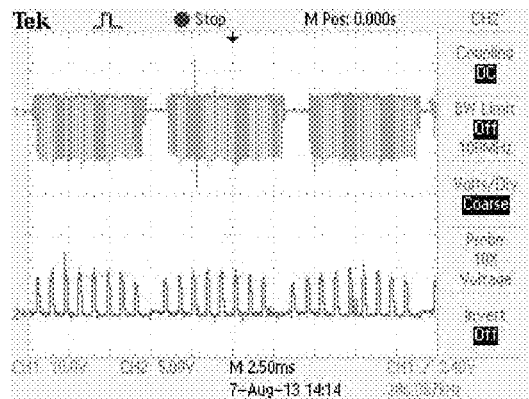
Figure 27C:
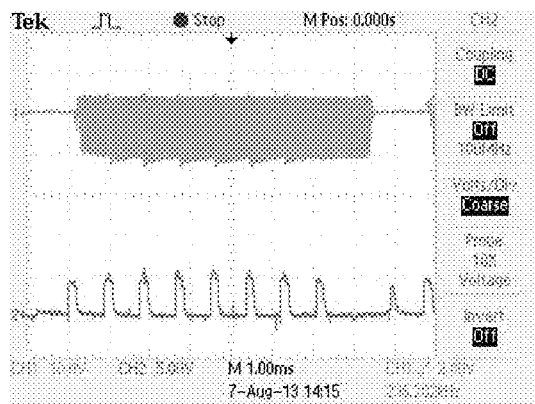
Figure 27D:
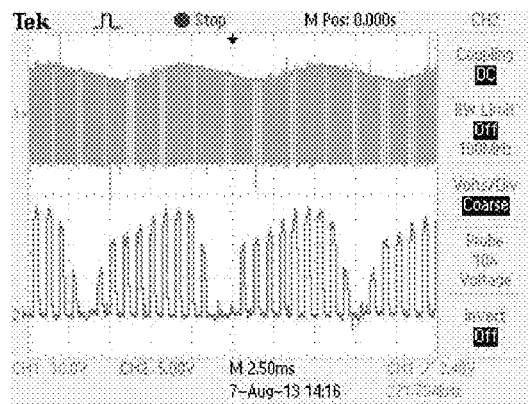
Figure 27E:
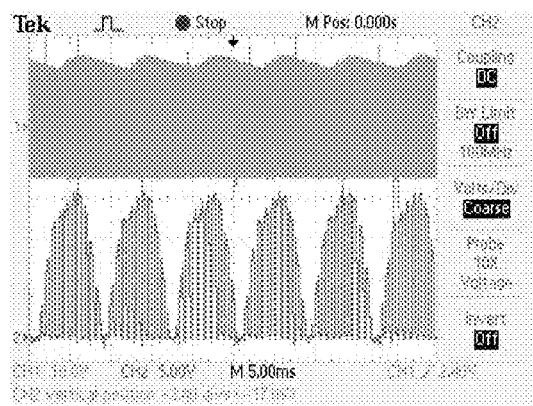

New Kichler Lighting Path Light Driver. A driver based on Monolithic Power Systems' MP24833 IC (configured for a Buck-Boost converter) switching at 200 kHz: This driver has good dimming capabilities with the wireless dimmer at around 1 kHz PWM frequency. FIGS. 27A-27E show the voltage across the switching inductor on CH1 (top signal in each of the figures) and the input voltage on CH2 (bottom signal in each of the figures). FIGS. 27A-27B are at a low dim level and 27C is a zoom in shot of the low dim level. As can be seen, the driver is not on all the time and possibly has some quazi-on time in the beginning and ending of the CH1 trace which shows burst periods of an ON-State. FIG. 27D shows a zoomed in picture with the dim level set to a high brightness. As can be seen, the driver is running at a near full on with little to no dead time. FIG. 27E is a zoomed out of the oscilloscope capture of FIG. 27D to show more waveforms on the screen.

The module of FIG. 25 may not work with all LED drivers. For example, one Hardscape LED driver is based on Orient-Chip's OCP8120 and is a Buck Converter. If the frequency is set to approximately 89 kHz and varies ±2 kHz, depending on input voltage range 9 to 15 VDC, the wireless dimmer of FIG. 25 does not work on this driver.

LED fixtures typically have an LED driver circuit having a switching circuit that acts as a converter to convert an input voltage to a signal suitable for driving an LED, e.g., either a buck converter, a boost converter, or a buck-boost converter. Although some LED driver circuits have switching circuits that have a dimming input that accepts a dimming signal to dim the LEDs using a control signal, the wireless addressable dimming module 12, 40 may cause many switching circuits of LED driver circuits to dim the LEDs without using the dimming input. Rather, the wireless addressable dimming module 12, 40 causes many switching circuits of LED driver circuits to dim the LEDs by providing a specially modulated input voltage to the LED driver circuit and its switching circuit.

Although not wanting to be bound by theory, it is believed that the wireless addressable dimming module 12, 40 works on LED fixtures that have a preferred reaction rate to the modulated input voltage that allows an average difference of energy at the output of the LED to be varied depending on the duty cycle of the switching circuit within the dimming module.

Figure 28A:
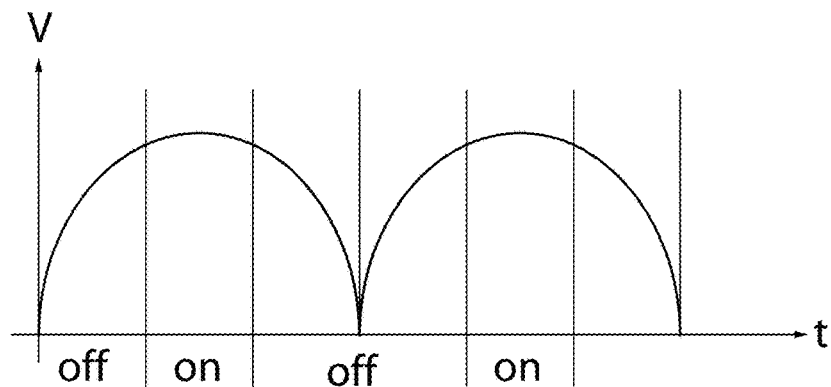
FIGS. 28A-28B are voltage plots showing conceptually a output response by an LED-driver circuit a to a dimmer module.
Figure 28B:
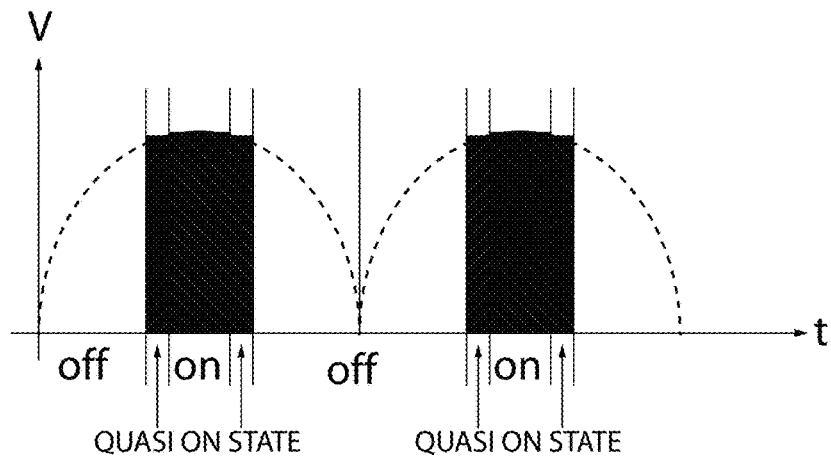

FIGS. 28A-B are voltage plots showing conceptually what is believed to be happening in some LED driver circuits permitting them to dim the LEDs in response to the output signal 16, 46 generated by the dimmer module 12, 40 (without intending to be bound by any particular theory). In a perfect LED driver circuit, represented by FIG. 28A, the LED driver is either ON (illuminating the LED) or OFF. In actual LED driver circuit embodiments, however, if you analyze the voltage across the inductor(s) (many LED driver circuits have one or more inductors as a primary energy storage element), one sees that the driver circuit is in a quasi-ON/OFF state at certain times when driven by the output signal 16, 46, such as when the driver circuit is about to turn ON or about to turn OFF, as represented by FIG. 28B.

The EV24833-N-00A Evaluation Board is an exemplary switching circuit for an LED driver. The EV24833-N-00A Evaluation Board can be dimmed using the wireless addressable dimming module 12, 40 without using the dimming input to cause the dimming. It is available from Monolithic Power Systems and uses an inductor as a main power element.

Figure 29A:
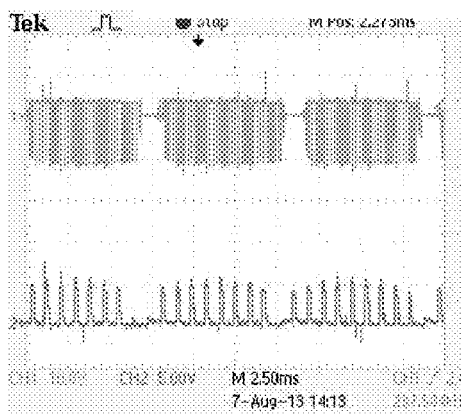
FIGS. 29A-29D show the voltage across a switching inductor and the input voltage for an exemplary wireless addressable dimming module according to FIG. 25 and with varying duty cycles.
Figure 29B:
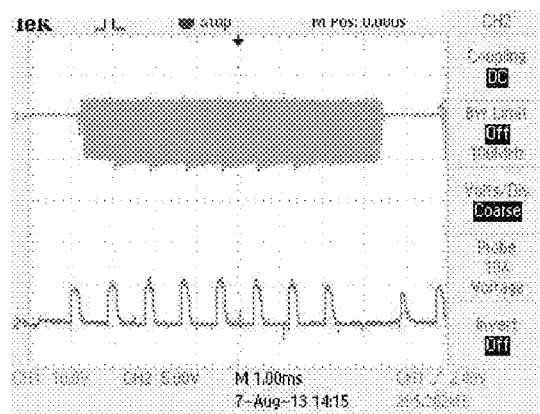
Figure 29C:
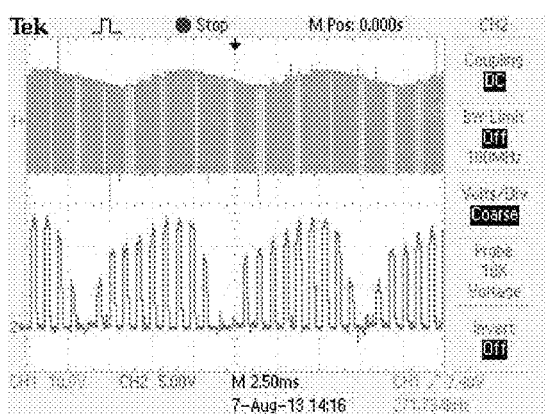
Figure 29D:
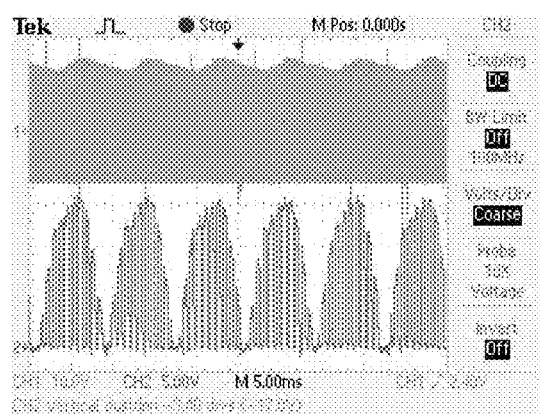

When the duty cycle of the switching circuit is small (say close to 10%) then looking at the voltage across the inductor within a Buck-Boost LED fixture (FIG. 29A, CH1=voltage across inductor, CH2=input voltage to Buck-Boost; FIG. 29B is a zoomed in version of FIG. 29A), it can be seen that there is a short period where the inductor has zero energy. If one were able to look at the average energy going to the LEDs, one would see an average current of 100 mA. Now if the duty cycle of the switching circuit is increased (say close to 50%) then looking at the voltage across the inductor (FIG. 29C) one would see the short period where the inductor has zero energy across it be reduced and the average energy going to the LEDs would increase. One may thus see an energy of 300 mA instead of the previous 100 mA. And as the duty cycle of the switching circuit is further increased (say 90%) then one would see the voltage across the inductor (FIG. 29D) have nearly zero dead time and the average energy at the LEDs would be even greater than before.

Figure 30:
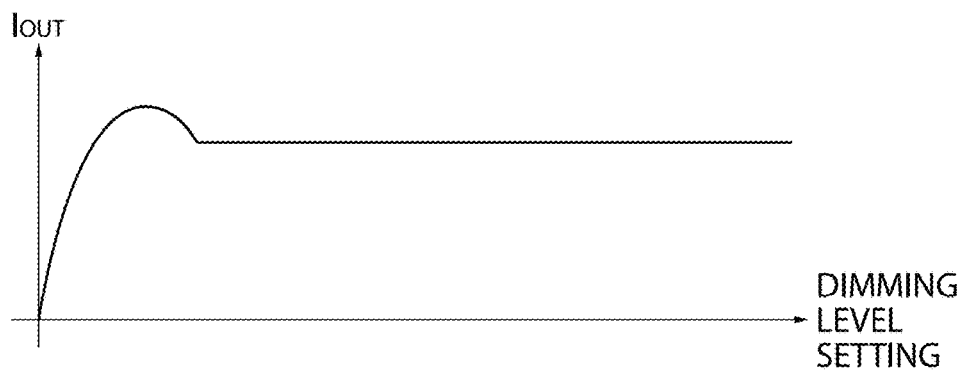
FIG. 30 shows a plot of current going through an LED fixture versus duty cycle of the switching circuit for an exemplary wireless addressable dimming module according to FIG. 25.

If the current going through the LED fixture is plotted against the duty cycle of the switching circuit one would notice a nonlinear curve (FIG. 30, below). This curve is believe to be nonlinear due to the in-rush current of the LED driver being turn ON/OFF and then after some point the zero-energy point for the system is reduced enough that the in-rush subsides and the driver is on fully and we have a constant current despite the duty cycle applied to the switching circuit.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, many of the examples herein are for low voltage landscape lighting; the disclosure herein applies equally to other systems, such as 120 VAC residential and commercial lighting systems and 12 volt and 24 volt LED tape light. As another example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

What is claimed is:

1. An apparatus, comprising:
    a lighting fixture with a light source extending from a stem;
    a lighting stake with a base having an opening formed therein to receive the stem for supporting the lighting fixture;
    an enclosure having a threaded opening on one side and a threaded projection on the other side to couple in-between and mechanically secure to the lighting fixture and the lighting stake and provide controllable dimming for the lighting fixture;
    at least one controllable switch supported by the enclosure and electrically connected between an input and an output;
    a receiver supported by the enclosure and configured to receive a dimming signal and transmit a dimming control signal; and
    logic configured to accept the dimming control signal and control the switch at a frequency of at least 200 Hz for a DC input signal and at least 600 Hz for an AC signal to generate a signal at the output terminals to dim the light source, wherein the light source is generally considered to be non-dimmable with conventional dimmers.

2. The apparatus of claim 1, wherein the dimming signal is a wireless signal and the receiver is a wireless receiver.

3. The apparatus of claim 1, further comprising an input signal monitor that monitors a parameter of the input signal and generates a monitor signal that used by the logic to automatically adjust the output to compensate for a detected difference in that input signal parameter.

4. The apparatus of claim 1, further comprising an input signal monitor that monitors a parameter of the input signal and generates a monitor signal that used by the logic to automatically adjust the output upwards a degree corresponding to a degree the input signal differs from the nominal value for that input signal parameter.

5. The apparatus of claim 1, further comprising a voltage monitor that determines a voltage of the input signal and generates a voltage monitor signal that used by the logic to automatically adjust the output upwards a degree corresponding to a degree the input voltage differs from the nominal voltage for that input signal.

6. The apparatus of claim 1, wherein the switch is switched at a frequency of between 600 and 2000 Hz, or between 600 and 1600 Hz, or between 600 and 1900 Hz, or between 600 and 5000 Hz, or between 600 and 10 KHz, or between 600 and 20 KHz, or between 900 and 2000 Hz, or between 600 and 1600 Hz, or between 900 and 1900 Hz, or between 900 and 5000 Hz, or between 900 and 10 KHz, or between 900 and 20 KHz, or between 1400 and 2000 Hz, or between 1400 and 1600 Hz, or between 1400 and 1900 Hz, or between 1400 and 5000 Hz, or between 1400 and 10 KHz, or between 1400 and 20 KHz.

7. The apparatus of claim 1, further comprising a switch frequency control with which a user can adjust the frequency the switch is cycled to adjust the appearance of the light source.

8. The apparatus of claim 7, wherein the switch frequency control is a hardware device with which a user can adjust the frequency the switch is cycled to adjust the appearance of the light source.

9. The apparatus of claim 7, wherein the switch frequency control is generated from a value wirelessly transmitted to the wireless receiver to adjust the appearance of the light source.

10. The apparatus according to claim 1, further comprising a stored identifier;
    wherein the dimming signal includes an identifier of one or more light sources to be dimmed via the dimming signal; and
    wherein the receiver is configured to receive the dimming signal, determine the identifier associated with the received dimming signal, compare its respective identifier to the received identifier, and transmit a dimming control signal responsive to the received identifier matching the received identifier.

11. The apparatus of claim 1, wherein the controllable switch comprises a MOSFET having a gate, a source, and a drain connection, the drain connection being connected to the output, and wherein the logic comprises:
    a microcontroller unit having a switcher control signal input electrically connected to the receiver;
    a frequency control signal input electrically connected to the receiver;
    a switcher control line output electrically connected to the gate of the controllable switch;
    a power circuit electrically connected to the microcontroller unit and the receiver to supply power to both the microcontroller unit and the receiver; and
    a full wave rectifier electrically connected between the input and the source of the controllable switch, the full wave rectifier also being electrically connected to the power circuit.

12. The apparatus of claim 1, further comprising:
    a voltage monitor that determines a voltage of the input signal and generates a voltage monitor signal that used by the logic to automatically adjust the output upwards a degree corresponding to a degree the input voltage differs from the nominal voltage for that input signal;
    wherein the switch is switched at a frequency of between 600 and 2000 Hz;
    a switch frequency control with which a user can adjust the frequency the switch is cycled to adjust the appearance of the light source; and
    a stored identifier;
    wherein the dimming signal includes an identifier of one or more light sources to be dimmed via the dimming signal; and
    wherein the receiver is configured to receive the dimming signal, determine the identifier associated with the received dimming signal, compare its respective identifier to the received identifier, and transmit a dimming control signal responsive to the received identifier matching the received identifier.

13. The apparatus of claim 12, wherein the controllable switch comprises a MOSFET having a gate, a source, and a drain connection, the drain connection being connected to the output, and wherein the logic comprises:
- a microcontroller unit having a switcher control signal input electrically connected to the receiver,
- a frequency control signal input electrically connected to the receiver,
- a switcher control line output electrically connected to the gate of the controllable switch;
- a power circuit electrically connected to the microcontroller unit and the receiver to supply power to both the microcontroller unit and the receiver; and
- a full wave rectifier electrically connected between the input and the source of the controllable switch, the full wave rectifier also being electrically connected to the power circuit.

14. The apparatus of claim 12, wherein the dimming signal is a wireless signal and the receiver is a wireless receiver and wherein the switch frequency control is generated from a value wirelessly transmitted to the wireless receiver to adjust the appearance of the light source.

15. The apparatus of claim 12, wherein the controllable switch comprises a MOSFET having a gate, a source, and a drain connection, the drain connection being connected to the output, and wherein the logic comprises:
- a microcontroller unit having
- a switcher control signal input electrically connected to the receiver,
- a frequency control signal input electrically connected to the receiver,
- a switcher control line output electrically connected to the gate of the controllable switch;
- a power circuit electrically connected to the microcontroller unit and the receiver to supply power to both the microcontroller unit and the receiver; and
- a full wave rectifier electrically connected between the input and the source of the controllable switch, the full wave rectifier also being electrically connected to the power circuit; and
- further comprising an enclosure having a threaded opening on one side and a threaded projection on the other side to couple in-between and mechanically secure to a lighting fixture and a lighting stake and provide controllable dimming for the lighting fixture; and wherein the dimming signal is a wireless signal and the receiver is a wireless receiver; and wherein the switch frequency control is generated from a value wirelessly transmitted to the wireless receiver to adjust the appearance of the light source.

16. The apparatus of claim 1, wherein the enclosure is formed in an annular shape.

17. A method of retrofitting a landscape lighting fixture for dimming control, comprising:
- providing a light fixture with a light extending from a threaded stem, wherein a wire extends from the light to provide an electrical connection;
- providing a landscape lighting stake with a base having a threaded opening formed therein and adapted to receive the threaded stem to support the light fixture;
- unscrewing the threaded stem of the light fixture from the threaded opening of the landscape lighting stake;
- providing a dimmer unit with an enclosure and a threaded extension extending from the enclosure, wherein the dimmer unit is formed with a threaded central opening that projects through the enclosure and the threaded extension;
- inserting the wire of the light fixture through the threaded central opening of the dimmer unit;
- twisting the threaded extension of the dimmer unit into the threaded opening of the landscape lighting stake to threadably secure the dimmer unit to the landscape lighting stake;
- twisting the threaded stem of the light fixture into the threaded central opening of the dimmer unit to threadably secure the light fixture to the dimmer unit;
- electrically connecting a power cable to the dimmer unit, wherein the power cable is adapted to connect to an external power source; and
- electrically connecting a dimmer unit output to the wire of the light fixture.

\* \* \* \* \*